United States Patent
Abraham et al.

(10) Patent No.: US 12,536,824 B2
(45) Date of Patent: Jan. 27, 2026

(54) METHOD OF IDENTIFYING RANKING AND PROCESSING INFORMATION OBTAINED FROM A DOCUMENT

(71) Applicant: Amadeus S.A.S., Biot (FR)

(72) Inventors: Eldho Abraham, Thrissur (IN); Thi Thuy Duyen Pham, Biot (FR)

(73) Assignee: Amadeus S.A.S., Biot (FR)

( * ) Notice: Subject to any disclaimer, the term of this patent is extended or adjusted under 35 U.S.C. 154(b) by 301 days.

(21) Appl. No.: 18/219,832

(22) Filed: Jul. 10, 2023

(65) Prior Publication Data

US 2024/0037971 A1 Feb. 1, 2024

(30) Foreign Application Priority Data

Jul. 29, 2022 (EP) .................................... 22306157

(51) Int. Cl.
  *G06K 9/00* (2022.01)
  *G06F 40/109* (2020.01)
  (Continued)

(52) U.S. Cl.
  CPC ...... *G06V 30/19107* (2022.01); *G06F 40/109* (2020.01); *G06F 40/30* (2020.01); *G06V 30/19093* (2022.01); *G06V 30/414* (2022.01)

(58) Field of Classification Search
  CPC . G06T 2207/30176; G06T 7/70; G16H 10/00; G16H 10/20; G16H 50/70;
  (Continued)

(56) References Cited

U.S. PATENT DOCUMENTS

2005/0278325 A1* 12/2005 Mihalcea .............. G06F 40/284
2009/0292685 A1 11/2009 Liu et al.
(Continued)

FOREIGN PATENT DOCUMENTS

CN 101388022 B 6/2010

OTHER PUBLICATIONS

European Patent Office, Extended European Search Report and Written Opinion issued in European patent application serial No. 22306157.3 on Jan. 20, 2023, 6 pages.
(Continued)

*Primary Examiner* — Atiba O Fitzpatrick
(74) *Attorney, Agent, or Firm* — Thompson Hine LLP

(57) ABSTRACT

Computer-implemented methods of automatically identifying, ranking, and processing information obtained from a document, and computerized systems and computer program products related thereto. The method involves identifying text clusters and identifying a visual layout structure of at least one part of the document, and ranking the text clusters according to visual properties of the text cluster. The method further involves identifying a semantic context of the identified text clusters and ranking the text clusters according to a similarity of the identified semantic context in relation to a given semantic context, to obtain a semantic context ranking, creating a total ranking of the text clusters based on a combination of a pair of rankings, and selecting text cluster(s) according to its position in the total ranking and providing the selected text cluster(s) to at least one downstream application.

19 Claims, 27 Drawing Sheets

(51) Int. Cl.
  *G06F 40/30* (2020.01)
  *G06V 30/19* (2022.01)
  *G06V 30/414* (2022.01)

(58) Field of Classification Search
  CPC ... G06F 16/35–358; G06F 40/279–295; G06F 40/30; G06F 40/35; G06V 30/19107; G06V 30/413; G06V 30/10; G06V 30/148; G06V 30/153; G06V 30/18; G06V 30/41; G06V 30/412; G06V 30/414; G06V 30/416; G06V 30/19093; G06V 30/158; G06V 30/42; G06V 30/274
  See application file for complete search history.

(56) References Cited

U.S. PATENT DOCUMENTS

| | | | | |
|---|---|---|---|---|
| 2019/0065840 A1* | 2/2019 | Saxena | ............... | G06N 5/046 |
| 2021/0004584 A1* | 1/2021 | Bildner | ............... | G06N 3/048 |
| 2021/0117617 A1* | 4/2021 | Blaya | ............... | G06N 20/00 |
| 2021/0295822 A1* | 9/2021 | Tomkins | ............... | G06F 16/3338 |
| 2021/0374395 A1* | 12/2021 | Tata | ............... | G06V 30/413 |
| 2023/0230408 A1* | 7/2023 | Arroyo | ............... | G06V 30/42 |
| | | | | 382/156 |
| 2024/0013563 A1* | 1/2024 | Seth | ............... | G06V 30/414 |

OTHER PUBLICATIONS

Yiheng Xu et al. "LayoutXLM: Multimodal Pre-training for Multilingual Visually-rich Document Understanding" (arXiv:2104.08836v3 [cs.CL] Sep. 9, 2021); https://doi.org/10.48550/arXiv.2104.08836; 10 pages.

Ashish Vaswani et al., "Attention Is All You Need" (arXiv:1706.03762v5 [cs.CL] Dec. 6, 2017); https://doi.org/10.48550/arXiv.1706.03762; 15 pages.

Richard S. Sutton et al., "Reinforcement Learning: An Introduction" Second Edition; The MIT Press, Cambridge, Massachusetts (1998); pp. 1-320.

* cited by examiner

KEYWORD ORDER

Your COVID-19 test result

1 [NEGATIVE] — 160

A negative result for this test means that SARS-CoV-2 RNA (the cause of COVID-19) was not detected in the collection sample.

2 — 161

What does it mean to have a [negative] test result?

162 — A negative test result does not completely rule out being infected with COVID-19.

3

If you test [negative] for COVID-19, this means the virus was not detected at the time your specimen was collected. It is still possible that you were very early in your infection at the time of your specimen collection and that you could test [positive] later. 1 — 163

Also, you could be exposed later and still develop the illness. For all these reasons, it is important to follow CDC guidance, including but not limited to frequent hand washing, social distancing, wearing a face covering, covering coughs and sneezes, monitoring symptoms, and cleaning and disinfectant of frequently touched surfaces - even after a negative test result.

Fig. 11A

METHOD OF IDENTIFYING RANKING AND PROCESSING INFORMATION OBTAINED FROM A DOCUMENT

TECHNICAL FIELD

The present invention generally is related to identifying ranking and processing information obtained from electronical or paper documents.

"LayoutXLM: Multimodal Pre-training for Multilingual Visually-rich Document Understanding" by Yiheng Xu et al. (arXiv:2104.08836v3 [cs.CL] 9 Sep. 2021) pertains to a LayoutXLM, a multimodal pre-trained model for multilingual document understanding is presented, which aims to bridge the language barriers for visually-rich document understanding. To accurately evaluate LayoutXLM, also a multilingual form understanding benchmark dataset named XFUND is introduced, which includes form understanding samples in 7 languages (Chinese, Japanese, Spanish, French, Italian, German, Portuguese), and key-value pairs are manually labeled for each language.

SUMMARY

According to first aspect, a computer-implemented method of automatically identifying, ranking, and processing information obtained from a document is provided. The method comprises identifying text clusters of the document; identifying a visual layout structure of at least one part of the document; ranking the text clusters according to visual properties of the text cluster, wherein the ranking is at least partly based on the visual layout structure of the document, to obtain a visual property ranking; identifying a semantic context of the identified text clusters; and ranking the text clusters according to a similarity of the identified semantic context of a text cluster in relation to a given semantic context, to obtain a semantic context ranking; and creating a total ranking of the text clusters based on a combination of the visual property ranking and the semantic context ranking; and selecting at least one text cluster according to the position of the at least one text cluster in the total ranking and providing the at least one selected text cluster to at least one downstream application.

According to a second aspect, a computerized system of automatically identifying, ranking and processing information obtained from a document is provided. The computerized system comprises at least one processor and at least one non-volatile memory, wherein the computerized system is arranged to: identify text clusters of the document; identify a visual layout structure of at least one part of the document; rank the text clusters according to visual properties of the text cluster, wherein the ranking is at least partly based on the visual layout structure of the document, to obtain a visual property ranking; identify a semantic context of the identified text clusters; rank the text clusters according to a similarity of the identified semantic context of a text cluster in relation to a given semantic context, to obtain a semantic context ranking; create a total ranking of the text clusters based on a combination of the visual property ranking and the semantic context ranking; and select at least one text cluster according to the position of the at least one text cluster in the total ranking and provide the at least one text cluster to at least one downstream application.

According to a third aspect, a computer program product comprising program code instructions stored on a computer readable medium to execute corresponding method steps, when said program is executed on a computer device.

SUMMARY

According to first aspect, a computer-implemented method of automatically identifying, ranking, and processing information obtained from a document is provided. The document is, for example, a genuine electronic document (pdf, j peg, etc.) or a scan or picture of a paper document. The document may be any visually rich document like a (material) data sheet, a diploma certificate, security clearance certificate, a receipt or a health certificate or the like.

The method comprises identifying text clusters of the document and ranking the text clusters according to visual properties of the text cluster, wherein the ranking is at least partly based on the visual layout structure of the document, to obtain a visual property ranking.

This includes, for example, analysing the visual appearance as well as the layout of the document 1. As a first step, text clusters on the document may be identified. This may be done by drawing bounding boxes around visually separated areas containing text on the document, for example by applying a YOLO algorithm (e.g., YOLO v2, etc.).

The text clusters identified are then further processed in a visual representation ranking, corresponding to a ranking according to visual properties and visual layout structure, and a ranking according to semantic understanding of the text cluster's content.

In the visual representation ranking, visual properties such as font type, font size, color, text density within the cluster and in the perimeter of the cluster etc. are considered. Typically, the text clusters that appear visually attractive (e.g., big font size, colored, less word density around etc.) are ranked higher than others. This makes use of the well-established principle that important information in official documents like, for example, a Covid 19 vaccination/test certificate is often highlighted so that this information can be grasped quickly by a human looking at the document. However, the method described herein may be applied to any visually rich document, like any health related, engineering related, or business-related document.

The method further comprises identifying a semantic context of the identified text clusters and ranking the text clusters according to a similarity of the identified semantic context of a text cluster in relation to a given semantic context, to obtain a semantic context ranking. The given semantic context may be set from outside the method (e.g., by a user) to be a medical context related to vaccination, test results, a engineering context, such as a electrical tool data sheet, a context related to a receipt etc.

To do so, as a first step the semantic context of a text cluster is identified, such as determining that the text cluster is related to personal information, a date, a medical information, billing/price information etc. This may be done by applying known techniques such as optical character recognition (OCR) and feeding the OCR output to a one-shot learning algorithm/transformer-based algorithm to recognize the semantic context.

Once the semantic context of the individual clusters has been identified, a ranking of the text clusters according the similarity/relevance of the identified semantic context of a text cluster in relation to a given semantic context is performed. To provide an example, the given semantic context may be a medical/technical semantic context or an administrative semantic context, such that text clusters classified as being related to a medical/technical context are ranked higher than text clusters identified as relating to an administrative context.

Based on a combination/merge of the visual representation ranking and the ranking according to semantic context a total ranking of the text clusters is obtained.

The combination/merge of rankings may involve adding the values of the ranking of the clusters according to the visual properties of the text cluster and the ranking of the text clusters according to the relevance/similarity of its semantic context in relation to a given semantic context and ranking the text clusters in the order of the sum values of the two rankings, ranking the clusters with the lowest rank sum value(s) highest. However, any other approach to combine the rankings may be pursued.

The overall principle of the method is to target visually attracting text clusters based on layout of the document and also based understanding the semantic of the text clusters on the document. The computer-implemented method performs a hybrid process between text processing and image processing.

This process involves information segregation of text clusters based on human attention to visual representation and/or information. An information mapping may be performed according to which the text clusters are ordered according to their importance based on a human attention model.

The method also comprises selecting at least one text cluster according to the position of the at least one text cluster in the total ranking and providing the at least one selected text cluster to at least one downstream application. A given number of highest ranked clusters (the n highest ranked clusters of N clusters in total) is provided to a downstream application.

Since only these selected text clusters have to be parsed and/or processed by the downstream application and not the entire document, less computational resources are needed/have to be reserved beforehand for the downstream application. This may be useful for fields of use in which the downstream application is the bottleneck of, for example, an access control architecture that is programmed to check whether a person is entitled to access based on security clearance, health status (e.g., valid Covid 19 vaccination or other vaccination certificate, negative Covid 19 test or other test certificate) or the like. The access control may be performed by an automatic door (not shown) of a check-in terminal or a security gate.

In some examples, a plurality of separate artificial neural networks perform different parts of the method: The identification of the text clusters of the document is, for example, performed using a text cluster identification neural network. Identifying a visual layout structure of at least parts of the document is, for example, performed using a visual layout structure identification neural network. The ranking of the text clusters according to visual properties of the text cluster is, for example, performed using a visual properties ranking neural network. The identification of the semantic context of the identified clusters is, for example, performed using a semantic context identification neural network. The ranking of the text clusters according to the similarity of the semantic context in relation to a given semantic context is, for example, performed using a semantic context ranking neural network. The total ranking of the text clusters is performed, for example, by a ranking-merging neural network. These separate neural networks are individually pre-parametrized and individually trained neural networks.

The text cluster identification neural network is used to identify the text clusters on a document. The text cluster identification neural network may be a convolutional neural network based on YOLO v2 or other algorithms used in image/pattern recognition. This convolutional neural network may produce bounding boxes around text clusters to be further analysed.

The identified text clusters may then be fed to two branches of networks that may be operated in parallel: The first branch of neural networks includes the visual layout structure identification neural network and the visual properties ranking neural network. The second branch of neural networks includes the semantic context identification neural network and the semantic context ranking neural network.

The visual layout structure identification neural network may identify patterns on the document as well as perform feature vector extraction to build at least one feature vector. These feature vector(s) may comprise a variety of different information like font color, font size, font style, distance between clusters, word density etc. The visual properties ranking neural network may rank the text clusters according to the identified visual layout structure and/or patterns of text clusters identified on the document. The visual properties ranking neural network may base the ranking on the feature vectors beforehand extracted from the document by the visual layout structure identification neural network.

In parallel, the semantic context identification neural network may identify the semantic context of the identified text clusters and the semantic context ranking neural network ranks said text clusters according to their semantic context in relation to the given semantic context, that is, as mentioned above, for example, predetermined by a user of the method.

The two rankings obtained by the two neural network branches are then fed to the ranking merging/combining neural network, which obtains a total ranking of the text clusters to be sent to a downstream application.

The separate neural networks may each be individually pre-parametrized and individually trained neural networks. Each neural network may be trained using reinforcement learning and/or supervised learning and/or unsupervised learnings known in the field and further specified in the description of examples (description of drawings) below.

In some examples, a font style and/or the font size and/or font color of tokens and/or characters in a text cluster is considered when ranking the text clusters according to visual properties. In some examples, a text density and/or a size of empty regions around a text cluster is considered when ranking the text clusters according to visual properties.

Considering the example of a Covid 19 test/vaccination certificate (or any other medical test/vaccination certificate): A particular number of N clusters may identified on the document: A official/government seal, personal information related to the patient (like the subject's name, the social security number/healthcare identifier), the test type/vaccination type, the test/vaccination date, the test result, field(s) with general information.

The important parts of the document, such as the subject's name, the test result, the vaccination type and date are, for example, formatted to be more visually attractive than the other text clusters of the document. To provide an example, these fields may be printed with colored bold font and capital letters. Furthermore, the word density around these text clusters may lower than the average word density on the document. As a result, these text clusters are ranked higher than the other text clusters in the visual representation ranking.

The method may also be designed to specifically search for keywords such as "positive" or "negative" in the course of the method and to specifically rank occurrences of these keywords according to their font side, color, font type, word density etc. in order to differentiate, for example, an actual result line from purely informative text like "what you I should do if my test result is positive?".

If a font size, color, font type analysis is applied, the information about this text properties could be extracted as a by-product of an OCR function applied to the document. The word density could be output also as a by-product by visual property identifying algorithms like a YOLO based algorithm.

When applying the case and color ranking criterion this way, the occurrences of the keyword negative with upper case and color may be assigned with a higher rank than other occurrences of a keyword like "positive" or "negative".

In some examples, the order of appearances of a keyword within the document is considered when ranking the text clusters according to the similarity of the identified sematic context of a text cluster in relation to a given semantic context.

An example of applying this ranking criterion "keyword order" to the example of a Covid 19 test document is to rank keywords like "negative" or "first" that appear first in the order of appearance in a document from top to bottom are ranked higher than keywords appearing further down in a document. This approach makes use of the principle that important information is often presented out front in official documents.

In some examples, the distance of a text cluster to a specific keyword is considered when ranking the text clusters according to visual properties including visual layout structure and/or when ranking the text clusters according to the similarity of the identified sematic context of a text cluster in relation to a given semantic context.

Such patterns on the document could also be used in the visual/layout properties ranking of text clusters, like the distance of a specific cluster to a key word like "vaccination", "positive" or "negative" etc. Furthermore, symmetric structure such as a structure providing the same distance between a date field 1 and a vaccination type filed 1 and also the same distance between a date field 2 and a vaccination type field 2, may be identified and result in ranking all text boxes in this structure high. This principle makes use of the often symmetric structure of vaccination certificates with respect to vaccination date and name fields.

In some examples, the identification of the semantic context of a text cluster is performed before the ranking of visual properties of the text cluster including the visual layout structure. In addition, the distance of a text cluster of a given semantic context to at least one other text cluster of the same or a different given semantic context is considered when ranking the text clusters according to visual properties including the visual layout structure.

The pattern identified in such examples may involve length and direction between vaccination date field(s) and vaccine name field(s). The direction, for example, defines in this example that the vaccine name is located below the vaccination date. The length or distance here defines the distance between the vaccination name and vaccination date fields on the document. Patterns of text clusters for which these distances and these directions are the same over the entire document may be ranked higher than patterns of text clusters that don't show such a symmetric alignment.

In some examples, the identification of the semantic context of a text cluster is performed before the ranking of visual properties of the text cluster including the visual layout structure and a vector alignment of text clusters of a given sematic context to other text clusters of a given semantic context is considered when ranking the text clusters according to visual properties including the visual layout structure. The given semantic context of the text clusters may be different—such as the semantic context refers to a date for one group of text clusters and for the semantic context of a test result for the other group of text clusters.

The vector alignment of text clusters of a given semantic context to other text clusters of a given semantic context is considered, for example, in the ranking and/or identification of text clusters representing a final dose layout on vaccination certificate documents, meaning the specific presentation of vaccine dates/vaccine names on the document along with a final dose number indicator like "3/3", "3 of 3", "3 von 3".

For identifying, evaluating a confidence of such a final dose layout the type of text clusters the arrangement of text clusters may be assessed according to at least one triangle constructed between text clusters comprising predefined keyword candidates as corner points of a triangle. The confidence of a final dose layout corresponds to the probability that the pattern of text clusters identified indeed corresponds to a (known triangular) final dose layout.

For identifying and evaluating the confidence of a symmetric layout of text clusters to correspond to a vaccination date-name matrix on a vaccination certificate, the arrangement of the text clusters may either be assessed according to vector alignment of (pairs of) text clusters according to a coordinate system or according to a parallelogram, wherein text clusters comprising predefined keyword candidates form the corner points of said parallelogram(s). The confidence of the symmetric layout also here corresponds to the probability that a pattern of text clusters indeed corresponds to a date-name matrix on a vaccination certificate.

In some examples, considering the vector alignment of text clusters includes checking whether text clusters of the same or a similar context are aligned along axes of a coordinate system with coordinate axes that are perpendicular to one another.

To do so, predetermined date candidates, vaccine name candidates, and dose keyword candidates may be fed to an analysis of text clusters identified on a document. Using these predetermined candidates, the coordinates of each vaccine date/vaccine name associated text cluster on the document may be determined. The coordinates of each total dose number indicator may also be identified.

It is then checked whether (pairs of) vaccine date and the vaccine name coordinates on the document together form a vector that is (practically) perfectly aligned with either a coordinate axis Ox or a coordinate axis Oy. In particular, the coordinate axes Ox, Oy are perpendicular to one another.

The measure of the alignment may be calculated by determining an angle between the coordinate axis Ox and/or Oy and the vector formed by the vaccine date and vaccine name coordinates. Small angles then stand for a high confidence related to alignment.

The resulting confidence is considered in the ranking of the text clusters forming the vaccination date, vaccination date pairs, such that a high confidence leads to a high ranking with respect to visual properties/layout. The confidence of the respective date-name pairs may also be transferred to downstream applications in order to identify the correct date-name pairs (and vectors) there at once.

In some examples, the identification of the semantic context of a text cluster is performed before the ranking of visual properties of the text cluster including the visual layout structure and wherein alignment of text clusters of a given sematic context according to at least one parallelogram is considered when ranking the text clusters according to visual properties including the visual layout structure.

This example may include as well that vaccine date candidates as well as vaccine name candidates and/or total dose number indicator candidates are received by the method. Using these candidates, the coordinates of the vaccine date text boxes and vaccine name text boxes on the document may be determined.

To determine the confidence of the symmetric layout of text clusters to correspond to a vaccination date-name matrix, it is, for example, checked to which degree the coordinates of the vaccine date text boxes and vaccine name text boxes are aligned according to a (specific) parallelogram with the vaccine name and date box coordinates forming the corner points of the parallelogram.

To determine this confidence, mid-point coordinates between vaccination date and vaccine name boxes may be calculated. The two mid-point coordinates with the closest distance to each other may be picked out and a normalized distance of these two closest mid-points may be calculated. For a parallelogram in the form of a perfect rectangle or square (that is likely to occur on an official vaccination certificate)—the distance between two such mid-points is close to zero or zero. Therefore, the closer the distance of such mid-points is, the higher the confidence of said symmetric layout of text cluster to correspond to vaccination date-name matrix will be.

Likewise, this resulting confidence is considered in the ranking of the text clusters forming the vaccination date, vaccination date pairs, such that a high confidence leads to a high ranking with respect to visual properties/layout. The confidence of the respective date-name pairs may also be transferred to downstream applications in order to identify the correct date-name pairs (and vectors) there at once.

The above-mentioned principle of determining the confidence of such a symmetric layout may be generalized to a vaccination matrix of N vaccinations, wherein the vaccination date and vaccine name coordinates together form corner points of a big parallelogram that includes N−1 smaller parallelograms. An example of a technique of calculating the confidence for such an arrangement is further explained in the detailed description of examples (description of the drawings) below (see FIG. 17).

In some examples, the identification of the semantic context of a text cluster is performed before the ranking of visual properties of the text cluster including the visual layout structure and wherein alignment of text clusters of a given sematic context according to at least one triangle is considered when ranking the text clusters according to visual properties including the visual layout structure.

This example refers to the determination of a confidence that a number of text clusters correspond to a final dose layout pattern.

Again, based on received vaccination date/vaccine date, total dose number indicator candidates, the coordinates of corresponding text boxes are determined. The coordinates of other dates on the document (e.g., random dates) may be determined as well.

To identify the confidence of n dose-name vector(s) triangles between the coordinates of a date text box, a vaccine name text box and a total dose number indicator may be formed, wherein the date text box may correspond to a vaccine date text box or a random date text box (random dates on a document and vaccination dates can normally not easily be distinguished from one another since date formats usually look alike).

For example, a first triangle may be constructed with the vaccine name box coordinate and a total dose indicator box coordinate and a first date coordinate on the document as corner points. A second triangle may be constructed with the vaccine name box coordinate and a total dose indicator box coordinate and a second date coordinate on the document as corner points.

A check may be performed if the dose indicator is valid (and not a footer). The area of the first and second triangles may be calculated. The triangle with the smallest area may be identified.

Based on the identification of the triangle with the smallest area, the confidence of a n doses date-name vector may be calculated such that the smaller the area of the identified triangle the higher the confidence associate with this triangle.

Indeed, the date within the smallest triangle is most likely to correspond to an actual vaccination date (not a random date)—so that the smallest triangle indeed marks a final dose layout.

The resulting confidence is considered in the ranking of the text clusters forming the vaccination date, vaccination date pairs, such that a high confidence leads to a high ranking with respect to visual properties/layout. The confidence of the respective date-name pairs may also be transferred to downstream applications in order to identify the correct date-name pairs (and vectors) there at once.

In some examples, when ranking the text clusters according to semantic context, text clusters with a medical semantic context, in particular related to a vaccine type or medical test type, are ranked higher than text clusters with a personal semantic context. This is, however, only the case if the method is applied to documents that should be assessed in a medical context. Any predetermined context is conceivable, such as an electrical or mechanical context. The context for which the semantic context ranking is determined is predeterminable by a user of the method.

In some examples, processing the identified text clusters according to their position in the total ranking comprises using a given number of highest ranked text clusters as input to a transformer encoder.

In some examples, the method is applied to textual content that has already been pre-processed by a single or multi-head attention function of a transformer encoder and the further processing of the identified text clusters according to their position of the total ranking is performed by at least one further stage of a transformer encoder.

The method of automatically identifying, ranking, and processing information obtained from a document may be used as a pre-attention function that is processed upstream of a transformer architecture. The method provides a selection of a number of text clusters that are ranked higher than the other text clusters of the document in view of a given context. The text clusters selected as such are provided, for example, to a multi-head attention module and a Add & Norm module. The method pre-selects the text clusters that are further analysed by the transformer architecture on a linguistic level. A transformer encoder, may then be used to screen the highest ranked clusters for expressions with the meaning that e.g., a Covid 19 test has a negative result or the like, for example, in order to classify a Covid 19 test to a "negative" and a "positive" class. A multi-head attention function, a Add & Norm module as well as a feed forward module and further a Add and Norm module—as part of the transformer architecture—may screen the text for a key value pair such as "test result" and "negative" etc.

By using the method as a pre-attention function, the transformer architecture is only applied to visually attractive regions that are also related to the desired context the amount of text processed by the transformer architecture is reduced such that the entire process of document classification requires less time and computation power.

The method of automatically identifying, ranking, and processing information obtained from a document may also be used as a post-attention module that is located/applied after a multi-head attention function in a transformer architecture (more particular: the transformer encoder).

The multi-head attention function of the transformer, for example, selects candidates of text clusters/text passages that are candidates for matching a certain key-value pair query, e.g., for a negative or positive Covid 19 test result. These text clusters that were pre-selected by the multi-head attention module 41 are then further filtered by the method acting as a post attention function according to visual layout properties and semantic context. Only a given number of text clusters that are ranked higher than other text clusters according to their visual representation and/or semantic meaning are then further processed by the downstream modules of the transformer architecture as feed forward and Add & Norm modules or the like.

The functions of a transformer module addressed above are described in detail in the paper "Attention Is All You Need" by Ashish Vaswani et al (arXiv:1706.03762v5 [cs.CL] 6 Dec. 2017).

According to a second aspect, a computerized system of automatically identifying, ranking and processing information obtained from a document is provided. The computerized system comprises at least one processor and at least one non-volatile memory, wherein the computerized system is arranged to: identify text clusters of the document; identify a visual layout structure of at least one part of the document; rank the text clusters according to visual properties of the text cluster, wherein the ranking is at least partly based on the visual layout structure of the document, to obtain a visual property ranking; identify a semantic context of the identified text clusters; rank the text clusters according to a similarity of the identified semantic context of a text cluster in relation to a given semantic context, to obtain a semantic context ranking; create a total ranking of the text clusters based on a combination of the visual property ranking and the semantic context ranking; and select at least one text cluster according to the position of the at least one text cluster in the total ranking and provide the at least one text cluster to at least one downstream application.

According to a third aspect, a computer program product comprising program code instructions stored on a computer readable medium to execute the method steps according to the first aspect when said program is executed on a computer device.

BRIEF DESCRIPTION OF THE DRAWINGS

Examples of the invention are now described, also with reference to the accompanying drawings.

FIG. 11A illustrates an example of the ranking criterion "keyword order" to the Covid 19 test document 1" in the ranking of visual/layout properties of a text cluster.

The drawings and the description of the drawings are of examples of the invention and are not of the invention itself. Like reference signs refer to like elements throughout the following description of examples.

DETAILED DESCRIPTION

Figure 1:
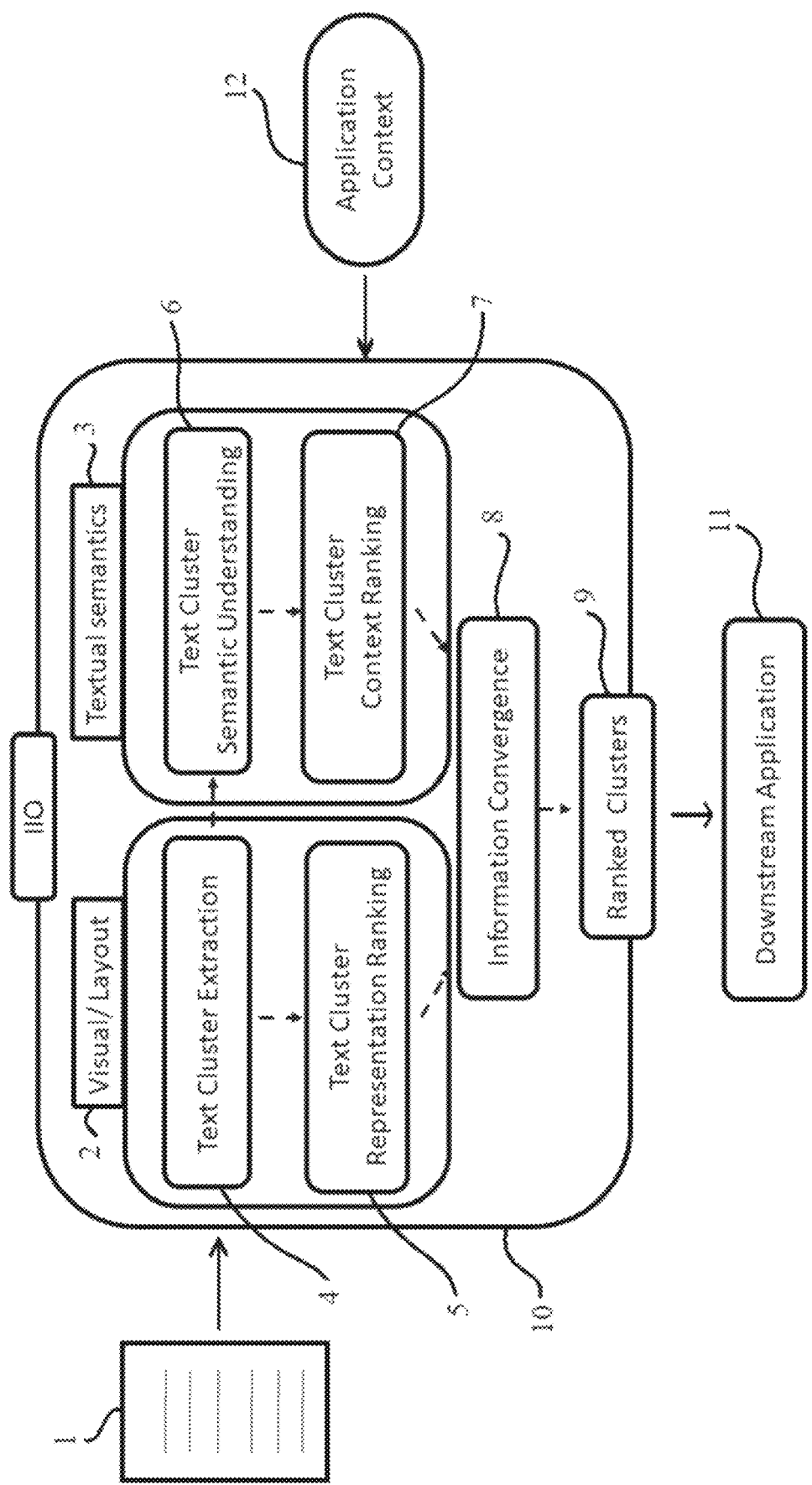
FIG. 1 illustrates a high-level schematic box diagram of an information importance order module implementing the method of extracting, ranking and further processing information extracted from a document.

A high-level schematic box diagram of the method of extracting, ranking and further processing information extracted from a document is illustrated by FIG. 1.

A document 1, which could be a genuine electronic document (pdf, j peg etc.) or a scan or picture of a paper document, is fed to an information importance order (110) module 10 performing the method according to the present disclosure.

The 110 module 10 is based on the principle to target visually attracting text clusters based on layout of the document 1 and understanding the semantic of the text clusters on the document. The 110 module 10 performs a hybrid process between text processing and image processing.

This process involves information segregation of text clusters based on human attention to visual representation. The concept is that the IIO module 10 is preconfigured (e.g., trained) to approach text clusters in a similar manner as the human mind. Eventually the 110 module 10 is used for an information mapping according to which the text clusters are ordered according to their importance based on a human attention model.

The IIO module 10 has a submodule 2 for analysing the visual appearance as well as the layout of the document 1. This submodule involves a text cluster extraction module 4, which segregates the document 1 into text clusters. This may be done by drawing bounding boxes around visually separated areas with text on the document 1, for example by applying a You Only Look Once (YOLO) algorithm.

The text clusters identified by the text cluster extraction module 4 are then provided to a text cluster representation ranking module 5 as well as to a text cluster semantic understanding module 6.

The text cluster representation ranking module 5 ranks the individual text clusters according to their visual properties, such as font type, font size, color, text density within the cluster and in the perimeter of the cluster etc (see FIGS. 2 to 19). Typically, the text clusters that appear visually attractive (e.g., big font size, colored, less word density around etc.) are ranked higher than others. This makes use of the well-established principle in documents that important information in official documents like a Covid 19 vaccination/test certificate is often highlighted so that this information can be grasped quickly by a human being looking at the document.

The text cluster semantic understanding module 6 identifies the semantic context of a text cluster, such as that the text cluster is related to personal information, a date, a medical information, billing/price information etc. The text cluster semantic understanding module 6 may apply known techniques such as optical character recognition (OCR) of which the output is fed to a one-shot learning algorithm/transformer-based algorithm to recognize the semantic context.

The output of the text cluster semantic understanding module 6 is fed to a text cluster context ranking module 7. This module 7 performs a ranking of the text clusters according the similarity/relevance of the identified semantic context of a text cluster in relation to a given semantic context. To provide an example, the given semantic context may be a medical semantic context or a billing semantic context, such that text clusters classified as being related to a medical or billing context are ranked higher than other text clusters.

The separate rankings provided by the text cluster representation ranking module 5 and the text cluster context ranking module 7 are merged by an information convergence module 8 to obtain ranked clusters 9. The merge of rankings may involve adding the values of the ranking of the clusters according to the visual properties of the text cluster and the ranking of the text clusters according to the relevance/similarity of its sematic context in relation to a given semantic context and ranking the text clusters in the order of the sum values of the two rankings, ranking the clusters with the lowest rank sum value(s) highest.

Figure 7:
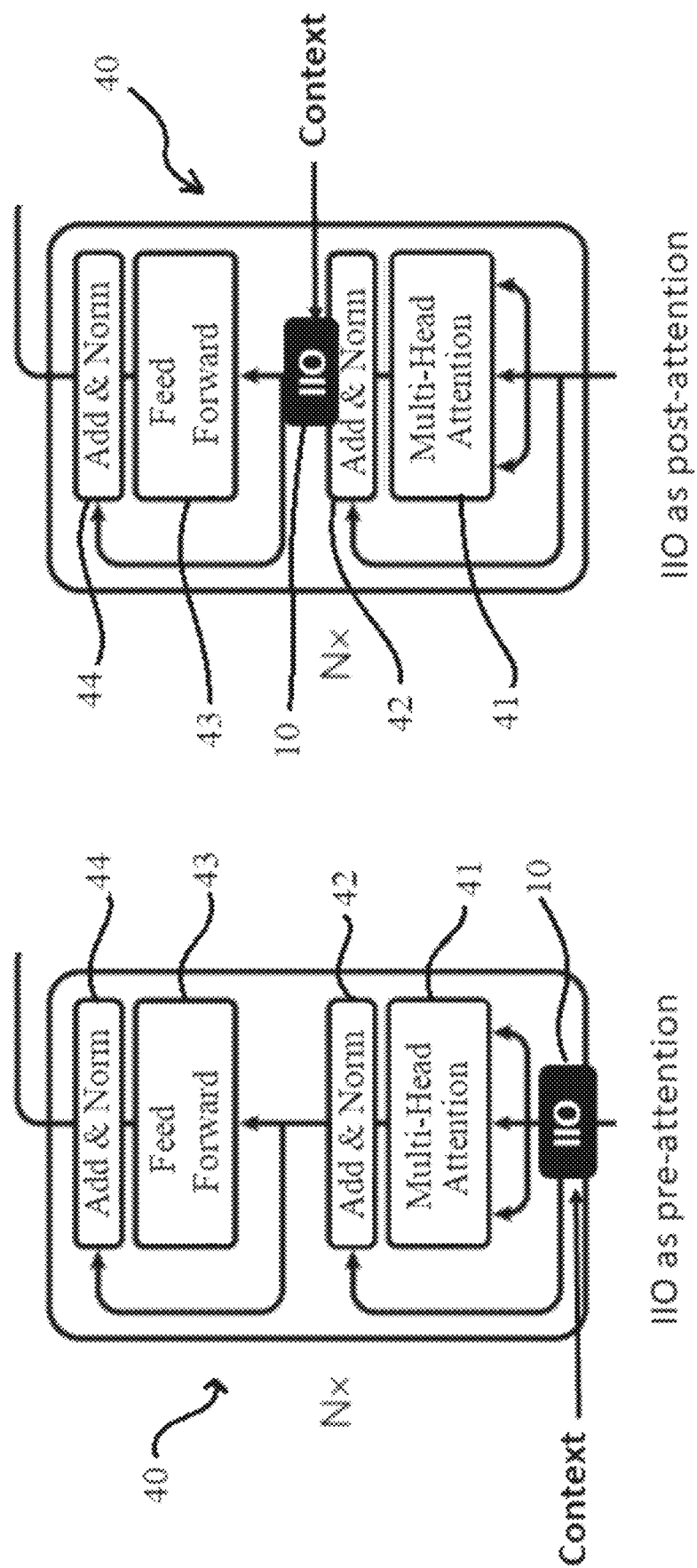
FIG. 7 illustrates two different examples of embedding the information importance order of FIG. 1 in a transformer module.

A given number of highest ranked clusters (the n highest ranked clusters of N clusters in total) is provided to a downstream application 11 (e.g., a transformer-based application to identify a vaccination date or the like—see FIG. 7).

Figure 2:
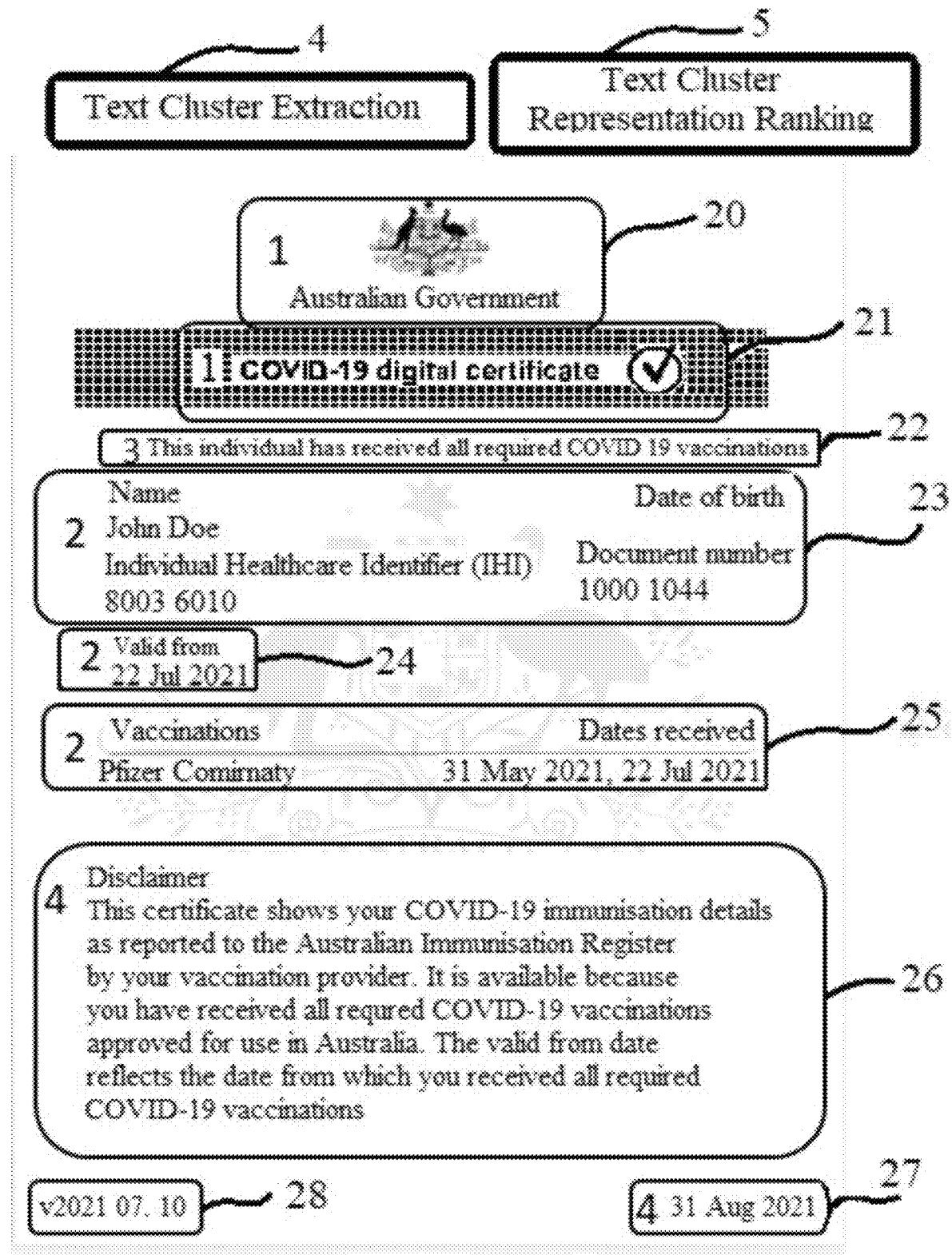
FIG. 2 illustrates an example for a result of text cluster extraction and text cluster representation ranking modules as shown in FIG. 1, when applied to a Covid 19 vaccination certificate of Australia.

An example for a result of the text cluster extraction 4 and text cluster representation ranking 5 modules when applied to an Australian Covid 19 vaccination certificate document are illustrated by FIG. 2.

The document 1' shown in FIG. 2 is a Covid 19 vaccination certificate. The cluster extraction module 4 identifies nine clusters in total on the document 1': An Australian Government seal 20, a title "Covid-19 digital certificate" 21, a info line 22 "This individual has received all required COVID 19 vaccinations", a personal information header 23 including the subjects' Name, Healthcare Identifier, as well as the document number, a validation date field 24, a vaccination type and date field 25 including the vaccination type and date, a disclaimer field 26, a generation date field 27, and a version field 28.

The cluster representation ranking module 5 assigns the following ranks to these identified text clusters according to their visual properties and/or document layout: Rank 1 is assigned to the Australian Government seal 20, as well as to the title 21. Rank 2 is assigned to the personal information header 23, the validation date field 24 and the vaccination type and date field 25. Rank 3 is assigned to the info line 22. Rank 4 is assigned to the disclaimer field 26, the generation date field 27 and the version field 28.

Figure 3:
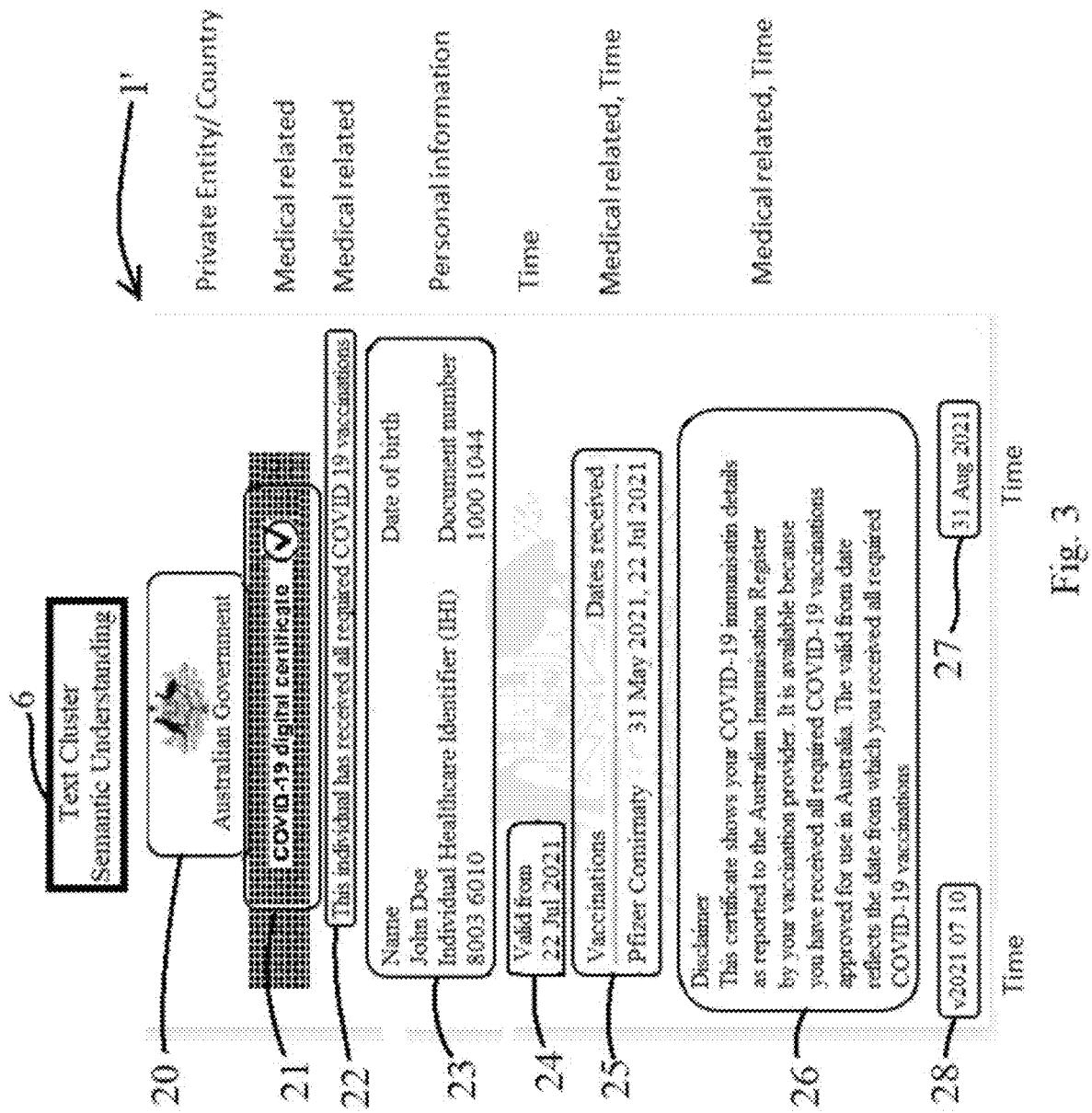
FIG. 3 illustrates a result of the text cluster semantic understanding module of FIG. 1 when applied to the Covid 19 vaccination certificate of Australia.

An example of a result of a text cluster semantic understanding module 6 when applied to the Covid 19 vaccination certificate of Australia document 1' is illustrated by FIG. 3.

The text cluster semantic understanding module 6 identifies the Australian Government seal 20 as a private entity/Country. The title 21 as well as the info line 22 are identified as medical related. The personal information header 23 is identified as personal information. The vaccination type and date field 25 is identified as medical related as well as related to time. The disclaimer field 26 is identified as medical related and Time information. The version and generation date fields 27, 28 are identified as Time information.

Figure 4:
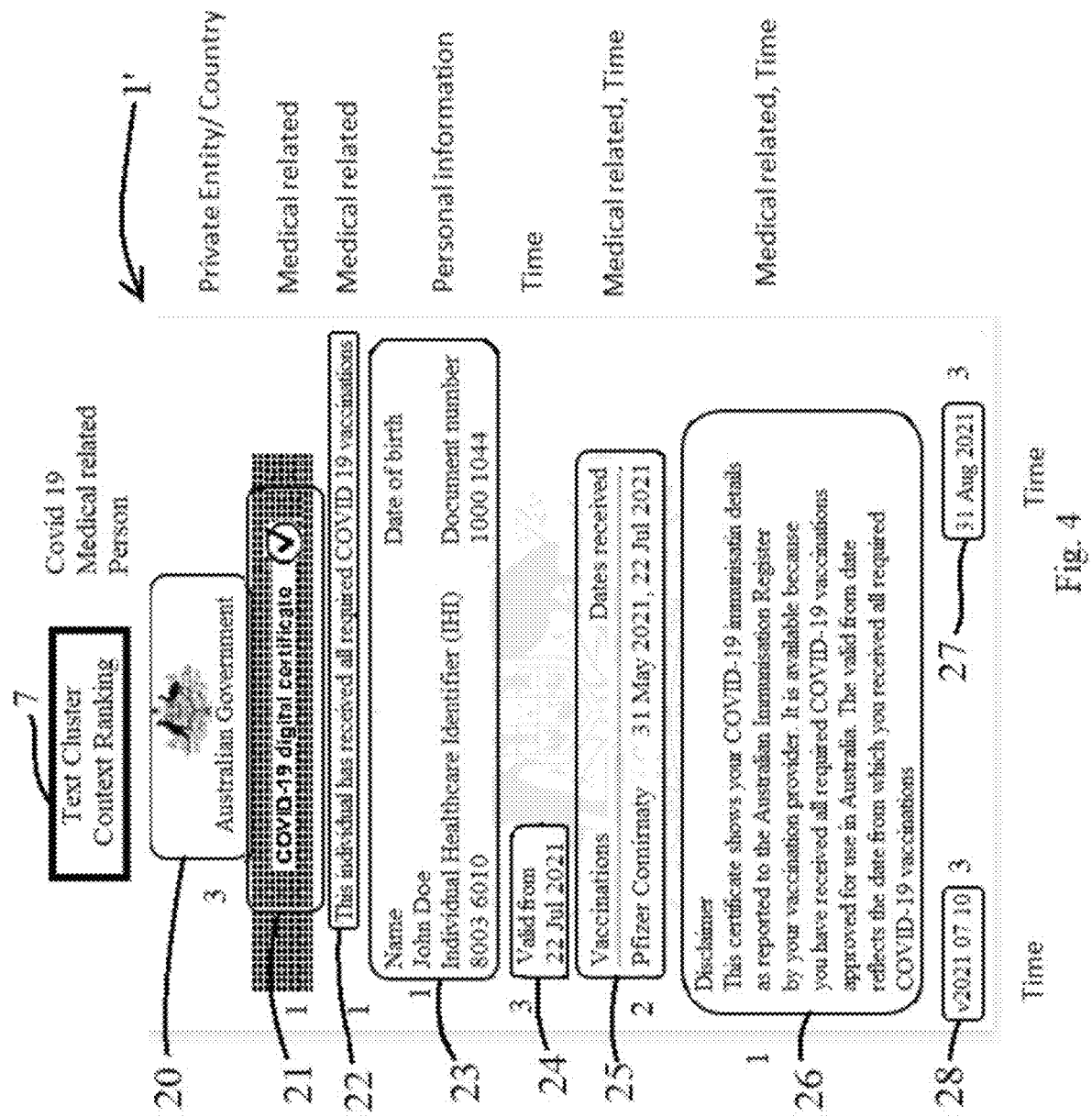
FIG. 4 illustrates an example for a result of the text cluster ranking module of FIG. 1 when applied to the Covid 19 vaccination certificate of Australia.

An example for a result of the text cluster ranking module of 7 when applied to the Covid 19 vaccination certificate of Australia document 1' is illustrated by FIG. 4.

The text cluster ranking module 7 assigns the following ranks to the text clusters according to the relevance/similarity of the identified semantic context of a text cluster in relation to the given semantic context (here: personal information context and medical context and Covid 19 context): Rank 1 is assigned to the title 21, the info line 22, as well as to the personal information header 23 and the disclaimer field 26. Rank 2 is assigned to the vaccination type and date field 25. Rank 3 is assigned to the validation date field 24, as well as to the generation date and version date fields 27, 28.

Figure 5A:
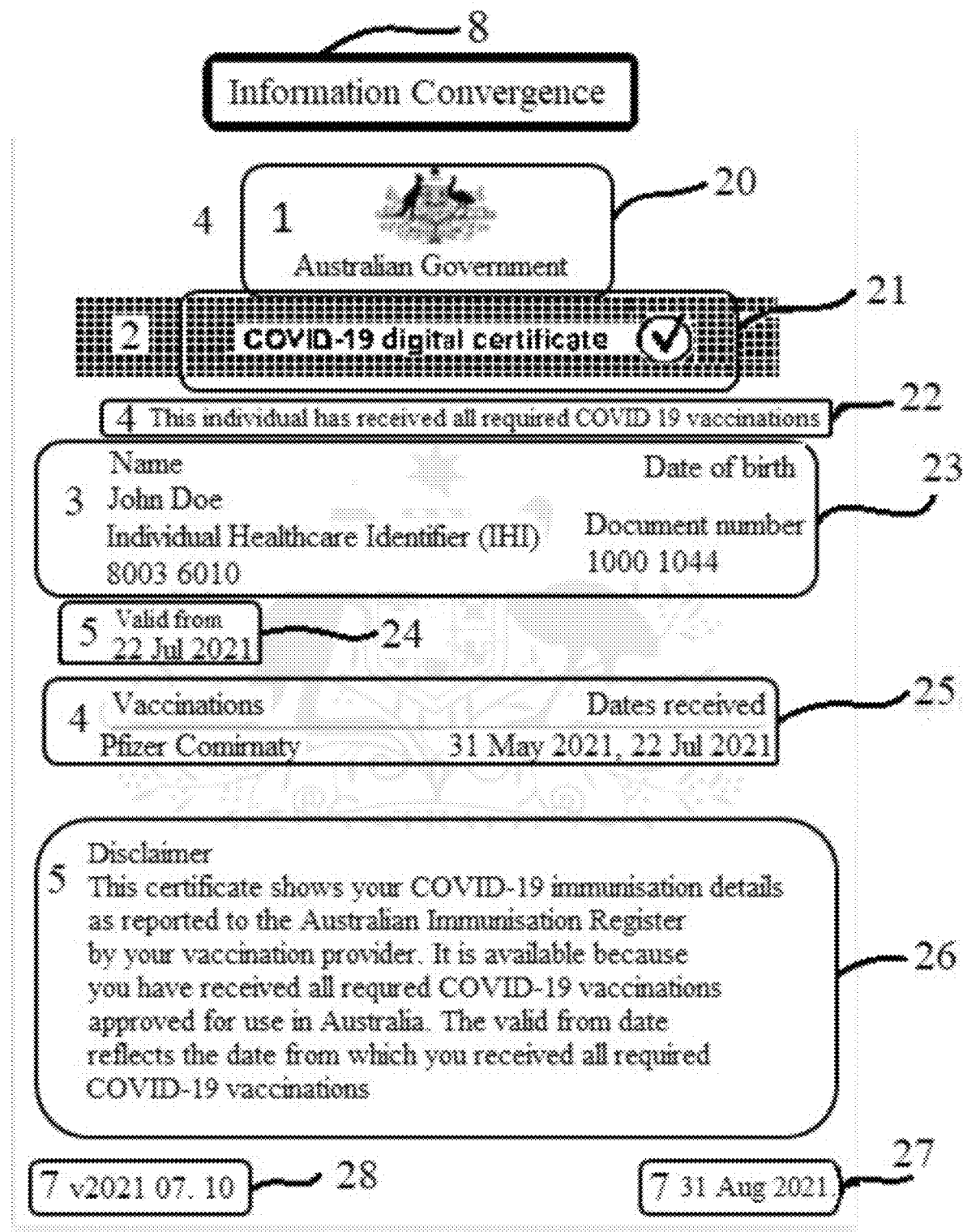
FIG. 5A illustrates an example for the result for the result of an information convergence module of FIG. 1 on the results by modules illustrated by FIGS. 2 to 4.
Figure 5B:
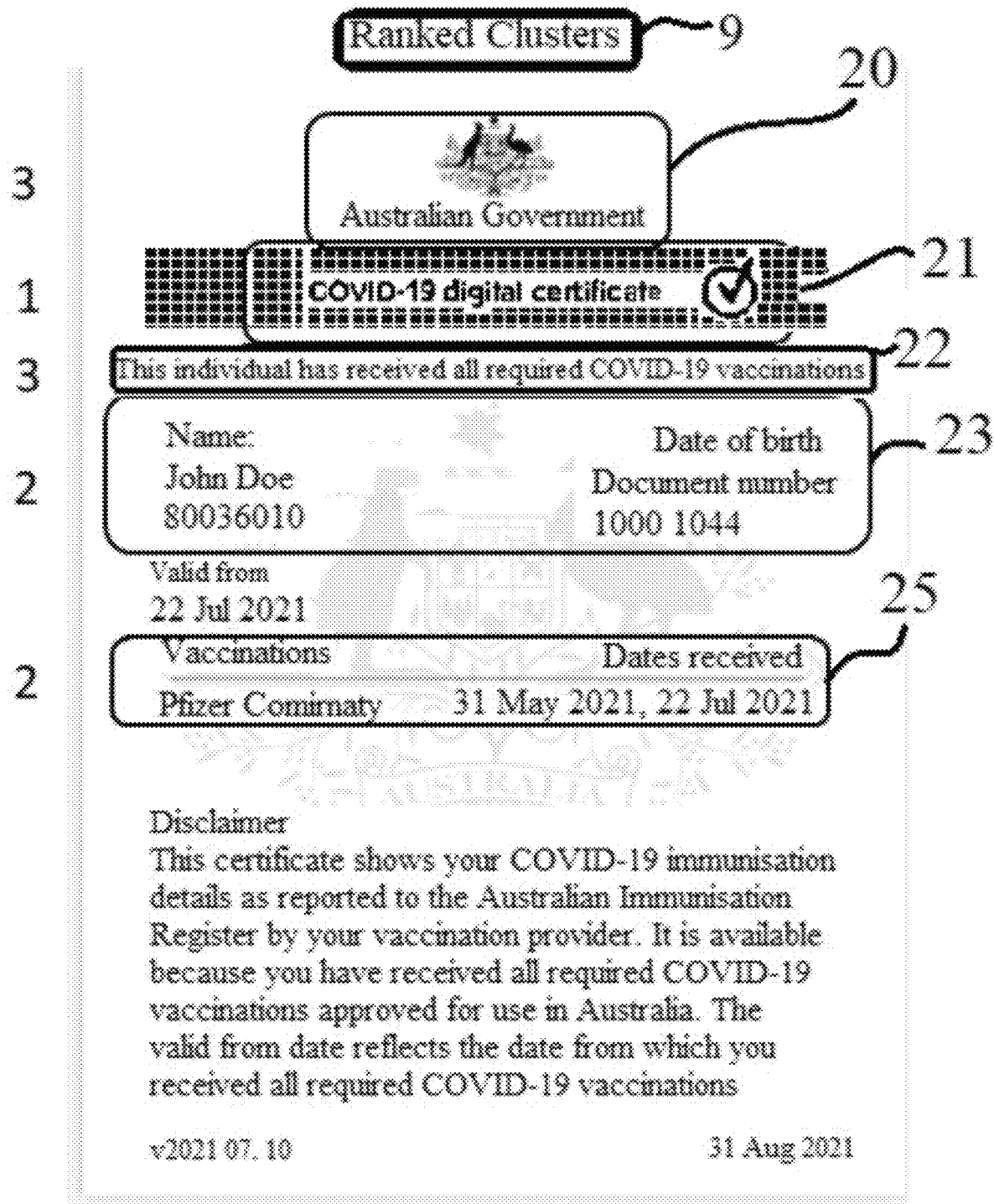
FIG. 5B illustrates a further example for the result for the result of an information convergence module of FIG. 1 on the results by modules illustrated by FIGS. 2 to 4.

An example of a merge result of the rankings provided by the text cluster representation ranking module 5 and the text cluster context ranking module 7 as obtained from the information convergence module 8 is illustrated by FIGS. 5A and 5B.

The rankings according to the relevance/similarity of the identified semantic context of a text cluster in relation to a given semantic context of personal information, medical information and Covid 19 (given semantic context)—wherein medical related information may be prioritized over personal information—and the rankings of the text clusters according to visual properties of said clusters are added together to provide the following sum of ranks for the text clusters:

The Australian Government seal 20 receives the sum of ranks 4, the title 21 is receives the sum of ranks 2, the info line 22 obtains the sum of ranks 4, the personal information header 23 receives the sum of ranks 3, the validation date field 24 receives the sum of ranks 5, vaccination type and date field 25 receives the sum of ranks 4, the disclaimer field 26 obtains the sum of ranks 5, the generation date field 27 and the version field 28 receive the sum of ranks 7.

As also shown in FIG. 5, these sums of ranks are used to obtain a total ranking of the ranked clusters 9. In the total ranking shown on the right-hand side of FIG. 5, only text clusters with ranks 1 to 3 are selected and shown. Hence, only a given number of text clusters associated with a total ranking below a threshold rank (in this example: rank 4) are selected for further processing in this example and thus sent to a downstream application 11.

In this total ranking, rank 1 is assigned to the title field 21, the rank 2 is assigned to the personal information header 23 as well as to the vaccination type and date field 25 and rank 3 is assigned to the Australian Government seal 20 and the info line 22.

Figure 6:
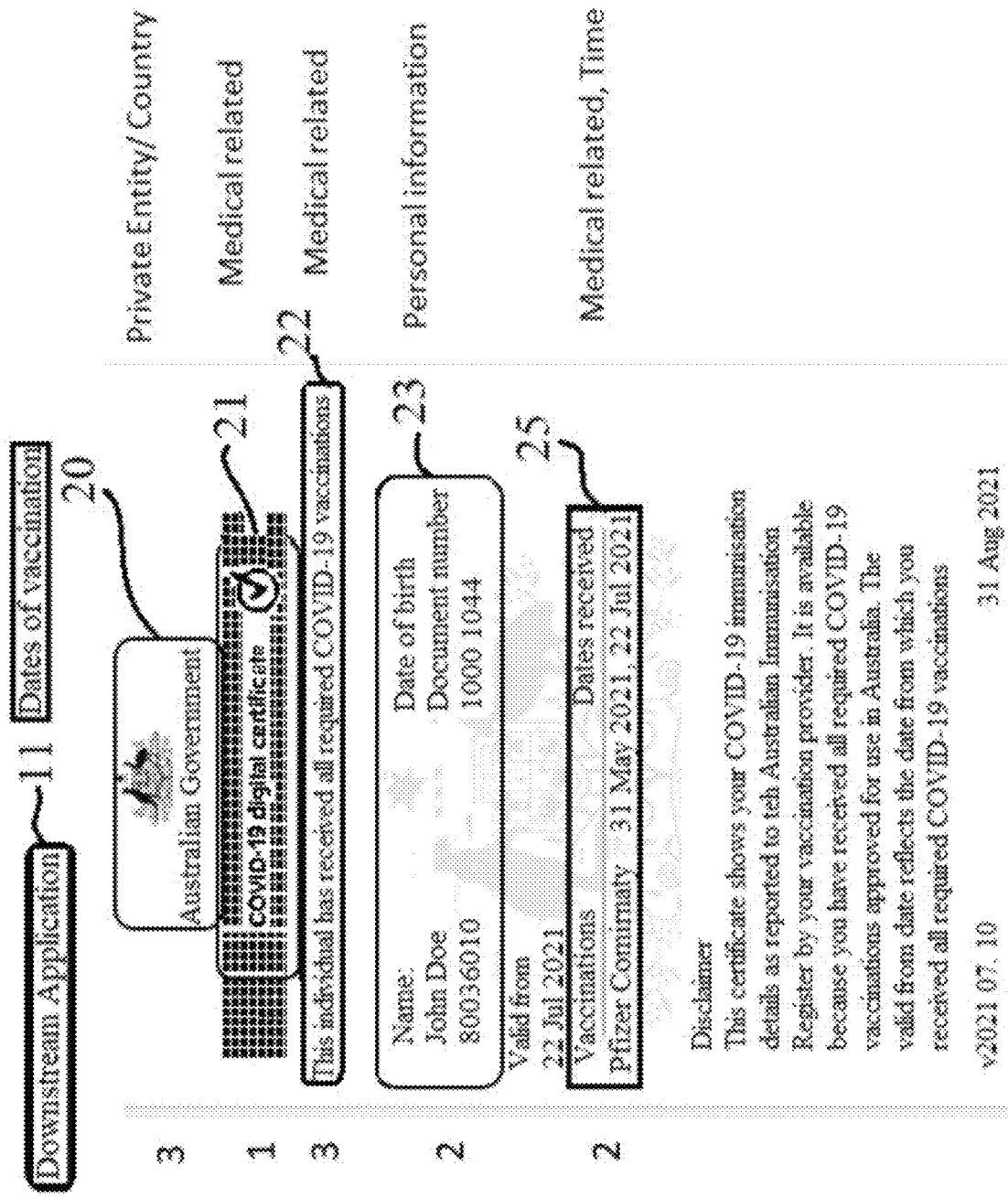
FIG. 6 illustrates an example for a selection of text clusters according to the ranking illustrated by FIGS. 2 to 5 that are sent to downstream application as by FIG. 1.

The text clusters that are selected according to their total ranking position to be processed by a downstream application 11 are shown in FIG. 6.

These selected text clusters will be processed by the downstream application 11, which, for example, searches the clusters for a number of vaccination dates and checks the time between a present day and the last vaccination date.

Since only these selected fields have to be parsed and/or processed by the downstream application and not the entire document, less computational resources are needed/have to be reserved beforehand for the downstream application 11.

The downstream application 11 may be the bottleneck of, for example, an access control architecture that is programmed to check whether a person has the full number of vaccinations (e.g., two or three vaccination dates detected) with the latest vaccination date being not older than e.g., one year.

The access control may be performed by an automatic door (not shown)—the check for a valid vaccination certificate may also be required at a self check-in terminal (not shown).

Two different examples of embedding the 110 module 10 (see FIG. 1) in a transformer module is illustrated by FIG. 7.

An IIO module 10 used as a pre-attention module that is located upstream of a transformer architecture 40 is illustrated on the left-hand side of FIG. 7.

The IIO module 10 provides a selection of a number of text clusters that are ranked higher than the other text clusters of the document in view of a given context.

The text clusters selected as such are provided to a multi-head attention module 41 and a Add & Norm module 42. The IIO module 10 therefore pre-selects the text clusters that are further analysed by the transformer architecture 40 on a linguistic level. The transformer architecture 40, in particular a transformer encoder, may then be used to screen the highest ranked clusters for expressions with the meaning that e.g., a Covid 19 test has a negative result or the like, for example, in order to classify a Covid 19 test to a "negative" and a "positive" class.

The multi-head attention function 41, Add & Norm module 42 as well as the feed forward 43 and further Add and Norm module 44 may screen the text for a key value pair such as "test result" and "negative" etc. By using the 110 module 10 in this pre-attention function, the transformer architecture are only applied to visually attractive regions that are also related to the desired context the amount of text processed by the transformer architecture 40 is reduced such that the entire process of document classification requires less time and computation power.

An IIO module 10 used as a post-attention module that is located/applied after a multi-head attention function of transformer architecture 40 (transformer encoder) is illustrated on the right-hand side of FIG. 7.

The multi-head attention function 41, for example, selects candidates of text clusters/text passages that are candidates for matching a certain key-value pair query, e.g., for a negative or positive Covid 19 test result.

These text clusters that were pre-selected by the multi-head attention module 41 are then further filtered by the IIO module 10 according to visual layout properties and semantic context. Only a given number of text clusters that are ranked higher than other text clusters are then further processed by the downstream modules as feed forward 43 and Add & Norm 44 and other functions like a transformer decoder (not shown).

The functions of the transformer module 40 addressed above are described in detail in the paper "Attention Is All You Need" by Ashish Vaswani et al (arXiv:1706.03762v5 [cs.CL] 6 Dec. 2017).

Figure 8:
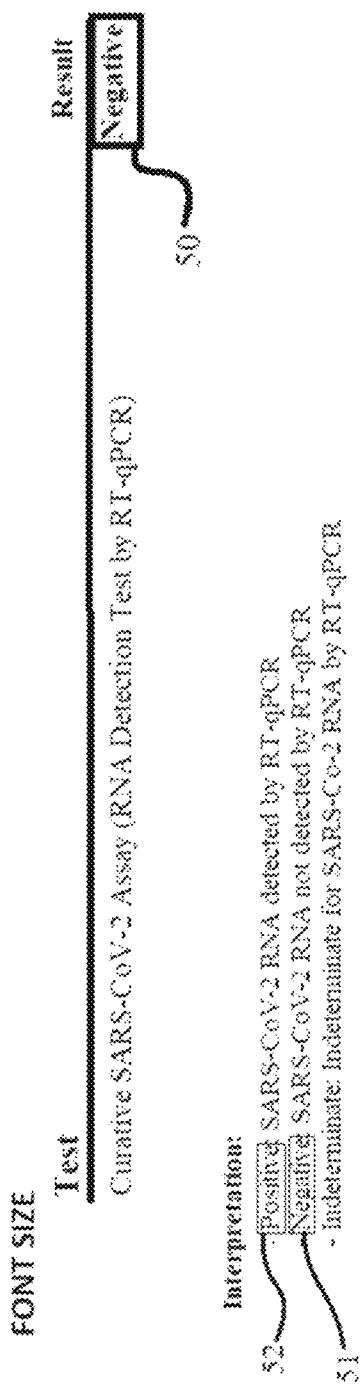
FIG. 8 illustrates an example of the criterion "font size" applied to a document for a ranking according to visual/layout properties of a text cluster.

An example of the criterion "font size" applied to a document for a ranking according to visual/layout properties of a text cluster is illustrated by FIG. 8.

The document 1″ is a Covid 19 test certificate. This knowledge is sent as an input parameter to the IIO module 10 (see FIG. 1). The knowledge that the words "positive" and "negative" are specific keywords may also be an input parameter for the IIO 10 (see FIG. 1).

The ranking criterion for visual/layout properties font size is illustrated by way of example only in view a Covid 19 test document 1″, where the result Negative 50 is written in a bigger font side in a text cluster widely spaced apart from passages of the test certificate that also include the keywords "positive" 52 and "negative" 51 but in a font size that is less than half of the font size of keyword "negative" 50 in the actual result line.

Therefore, when preconfiguring the IIO 10 to consider the criterion font size in the visual/layout properties ranking of the text clusters that contain a keyword, the keyword negative in the result line is ranked higher than the other appearances of keywords "positive" 52 and "negative 51 in the remaining text clusters present in the document 1″.

The font size could be output as a by-product of a OCR function applied to the document 1″.

Figure 9:
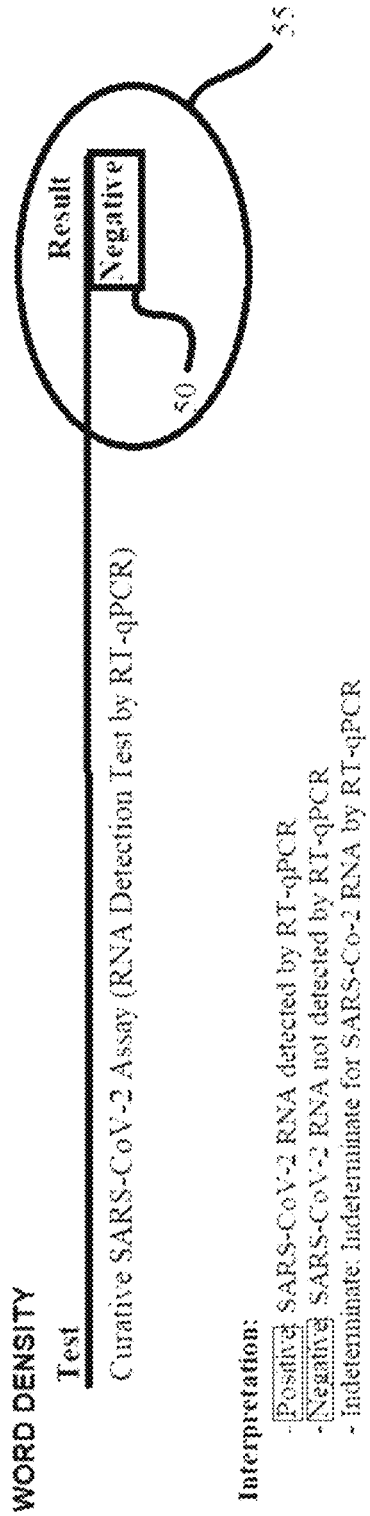
FIG. 9 illustrates an example of the criterion "word density" applied to a document for a ranking according to visual/layout properties of a text cluster.

An application of the criterion "word density" to the Covid 19 test document 1″ in the ranking of visual/layout properties of text clusters is illustrated by FIG. 9.

The word density 55 around the keyword negative 50 is by far lesser than the word density around 56 around other keywords like negative 51 or positive 52 in this document 1″.

Therefore, also when preconfiguring the IIO 10 to consider the criterion word density in the visual/layout properties ranking of the text clusters that contain a keyword, the keyword negative 50 in the result line is ranked higher than the other appearances of keywords "positive" 52 and "negative 51 in the remaining text clusters present in the document 1″.

The word density could be output by visual property identifying algorithms like a YOLO based algorithm.

Figure 10:
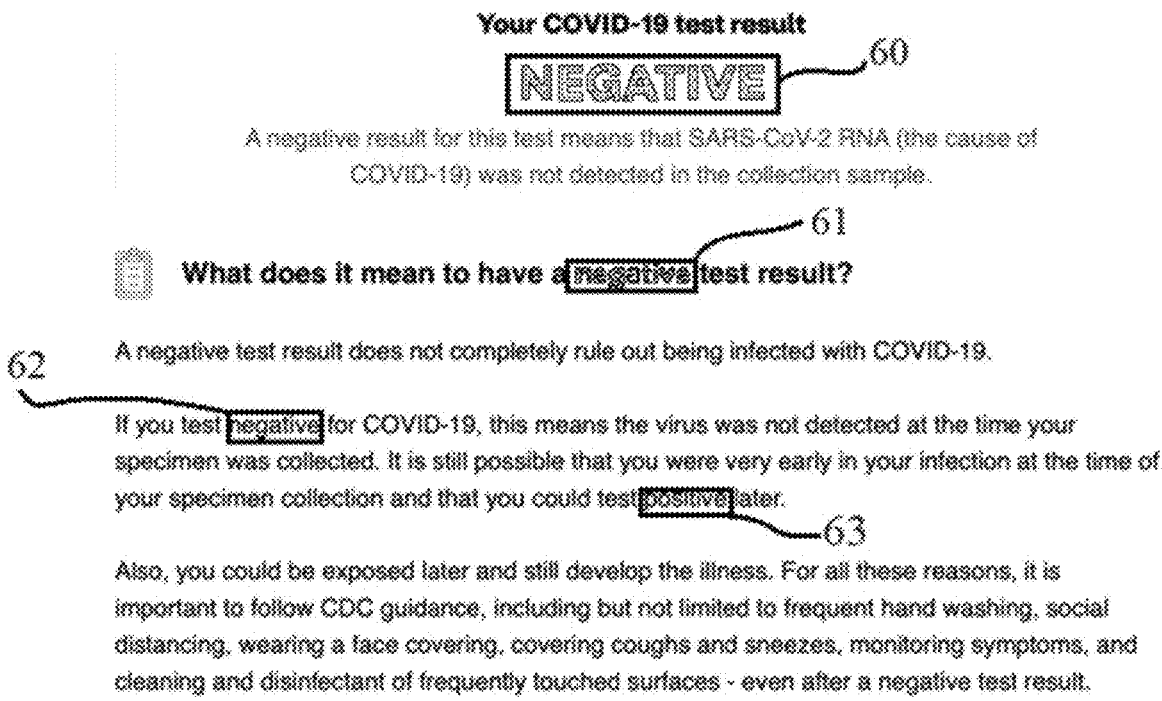
FIG. 10 illustrates an example of the ranking criterion "case and color" applied to a document for a ranking according to visual/layout properties of a text cluster.

An application of the criterion "case and color" to the Covid 19 test document 1‴ in the ranking of visual/layout properties of text clusters is illustrated by FIG. 10.

In this example illustrated by FIG. 10, the keyword negative 60 is depicted with upper case and colored in the result line. The keyword negative 60, 61, 62 as well as the keyword positive 63 is also occurring in different text clusters in the document.

In the line "What does it mean to have a negative test result" the keyword negative 61 is also colored, e.g., has a font color that is different to the font color in the surrounding of the keyword, but written in lower case letters.

When applying the case and color ranking criterion, the occurrences of the keyword negative with upper case and color 60 may be assigned with rank 1. The cocurrent of the keyword negative with lower case but color 61 may be assigned with rank 2, while the occurrences with lower case and without color may be assigned with rank 3.

Therefore, also in this example, using case and color as a ranking criterion makes sure that the text cluster that carries the actual result obtains a higher rank than other text clusters in the document 1‴.

Figure 11B:
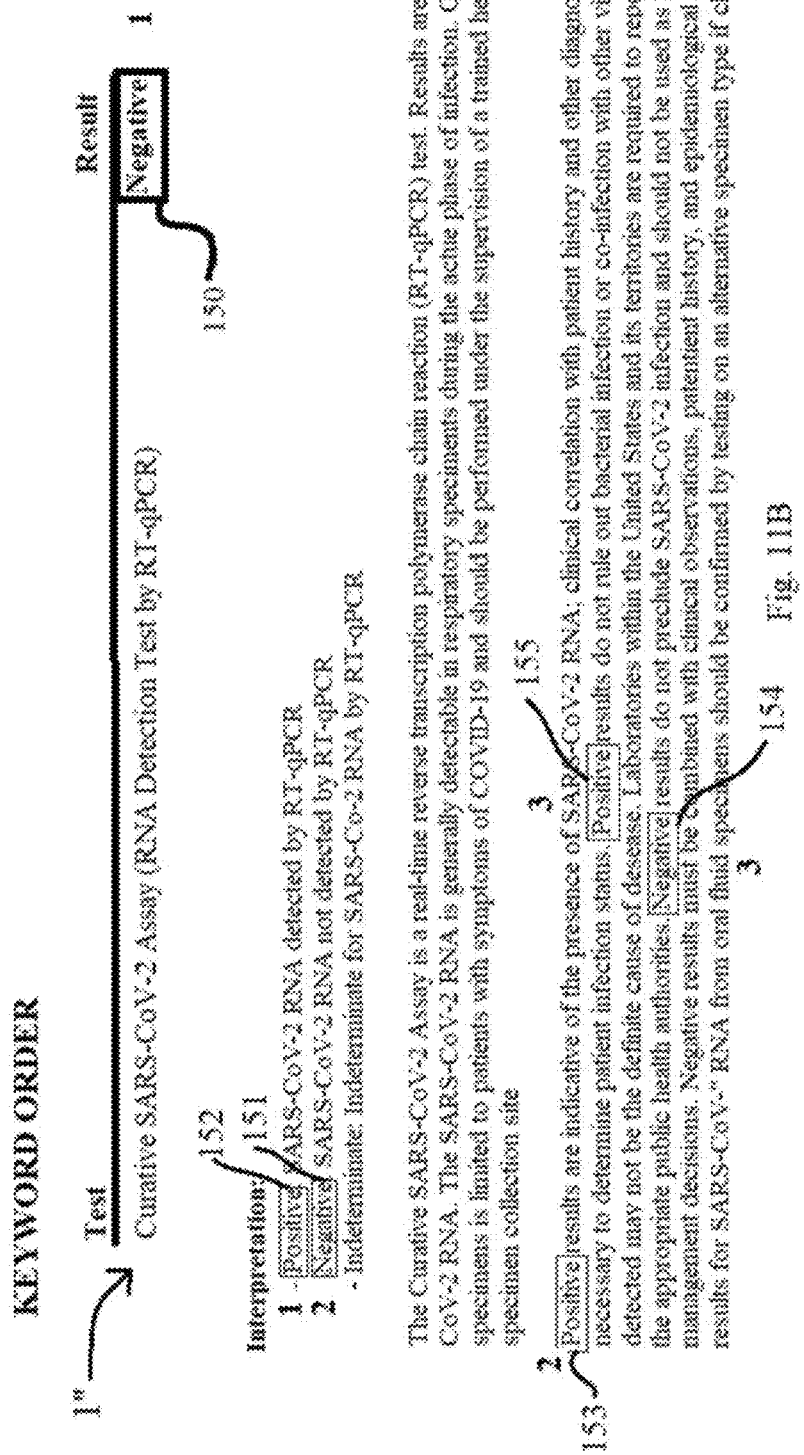
FIG. 11B illustrates a further example of the ranking criterion "keyword order" to the Covid 19 test document 1'" in the ranking of visual/layout properties of a text cluster.

An example of an application of the ranking criterion "keyword order" to the Covid 19 test documents 1″ and 1‴ in the ranking of visual/layout properties of text clusters is illustrated by FIGS. 11A and 11B.

The order of a keyword that appears on the document from top to bottom on the Covid 19 test document 1‴ is marked on FIG. 11A. The first keyword that appears is "negative" 160, the second keyword is also "negative" 161—the third keyword is also "negative" 162. The other keyword "positive" 163 only appears further down in the document after appearances of the keyword "negative" 160, 161, 162.

The keywords that appear first in the order of appearance in a document from top to bottom are ranked higher than keywords appearing further down in a document. Therefore, in this example the keyword "negative" (=the actual test result) is ranked highest.

In the Covid 19 test document 1″ (FIG. 11B) the keyword "negative" 150 appears first in the document (from top to bottom), as well. The first appearance of the keyword "positive" 151 is further down the document. Therefore, also in this document the keyword (=the actual test result) is ranked highest.

Figure 12:
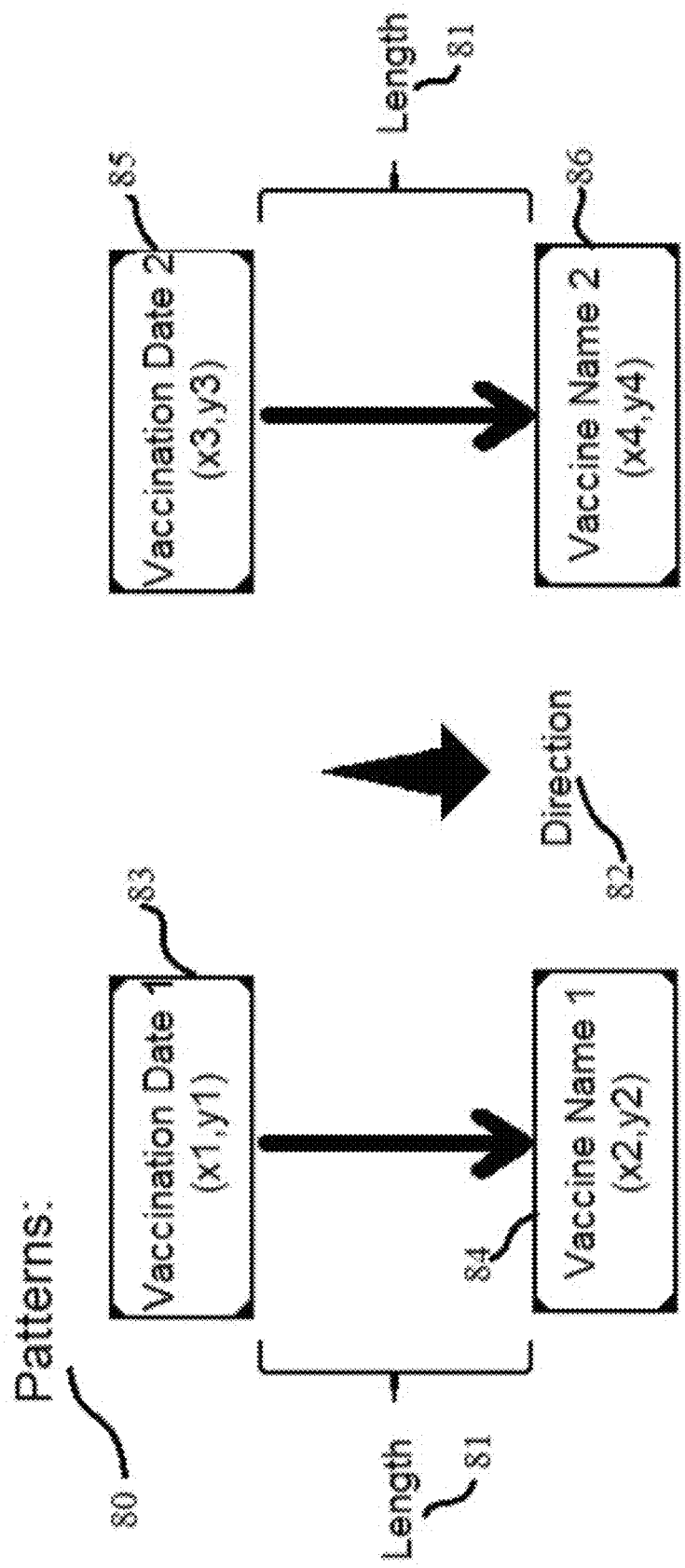
FIG. 12 illustrates an example of document patterns that may be used in the ranking of visual/layout properties of a text cluster.

An example of document patterns that may be used in the ranking of visual/layout properties of a text cluster is illustrated by FIG. 12.

The pattern 80 identified in this example is that the length and direction between a vaccination date 1 field 83 and a vaccine name 1 field 84 may be the same between an analogous pair of fields, namely the vaccination date 2 field 85 and the vaccine name 2 field 86. The direction defines in this example that the vaccine name is located below the vaccination date. A text cluster showing such a pattern will be ranked higher than text clusters without such a pattern in this example.

Further patterns 80 could also be used in the visual/layout properties ranking of text clusters, such as the distance of a specific cluster to a key word like "vaccination", "positive" or "negative" etc.

Figure 13:
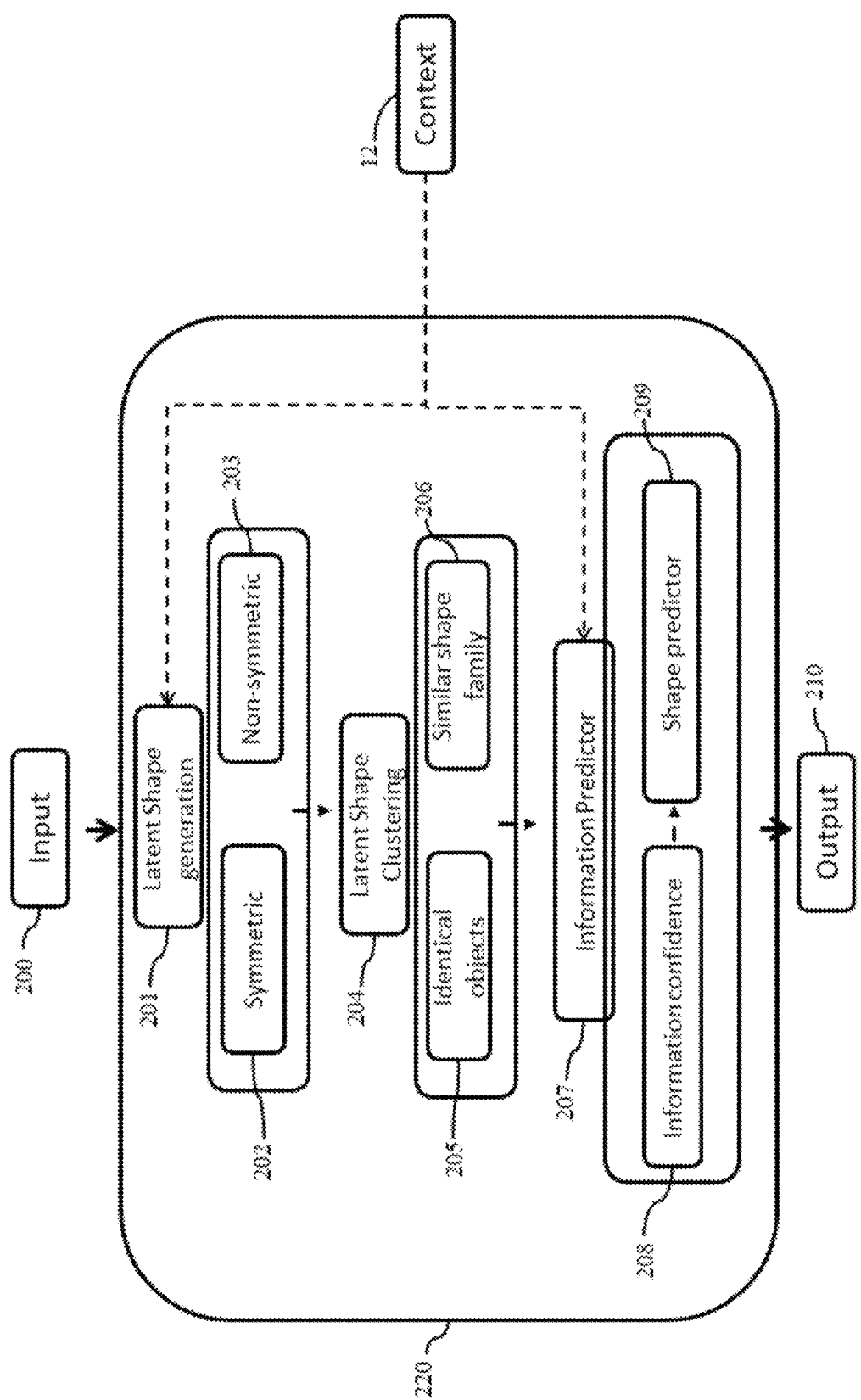
FIG. 13 illustrates an example of a latent shape detection module used to identify document patterns.

An example of a latent shape detection module used to identify document patterns is illustrated by FIG. 13.

An input 200, in this example, an electronic document like a scanned Covid certificate or test etc. is received by the latent shape detection module 220 along with a context 12 according to which the latent shapes should be evaluated. More specifically, the context is received by the latent shape generation 201 and information predictor 207 submodules of the latent shape detection module 220. The context 12 may determine here, which template shapes should be used for a classification of the objects in the input (hence, which shapes are to be expected when a particular type of document is processed).

The latent shape generation 201 classifies the structures found on the input document, which may be obtained by identifying text cluster coordinates on the input 200 and interconnecting them to find structures, into symmetric 202 and non-symmetric structures. Symmetric structures 202 may be symmetric with respect to an arbitrary axis on the electronic document serving as input 200.

In a latent shape clustering 204 sub module, finds identical objects t also objects belonging to a similar shape family (like circle and ellipsoid etc.) and forms clusters of (i) identical objects and/or (ii) objects belonging to a similar shape family.

An information predictor module 207 may obtain a matching percentage (as an information confidence measure) for a specific shape that stands for a specific result (for example, 3 of 3 vaccine doses received etc.). In doing so, the information predictor module 207 uses an information confidence 208 module and a shape predictor 209. The result of this information predictor module 207 (for example: three symmetric parallelograms with a confidence percentage of 98%) is provided to an output 210.

Figure 14:
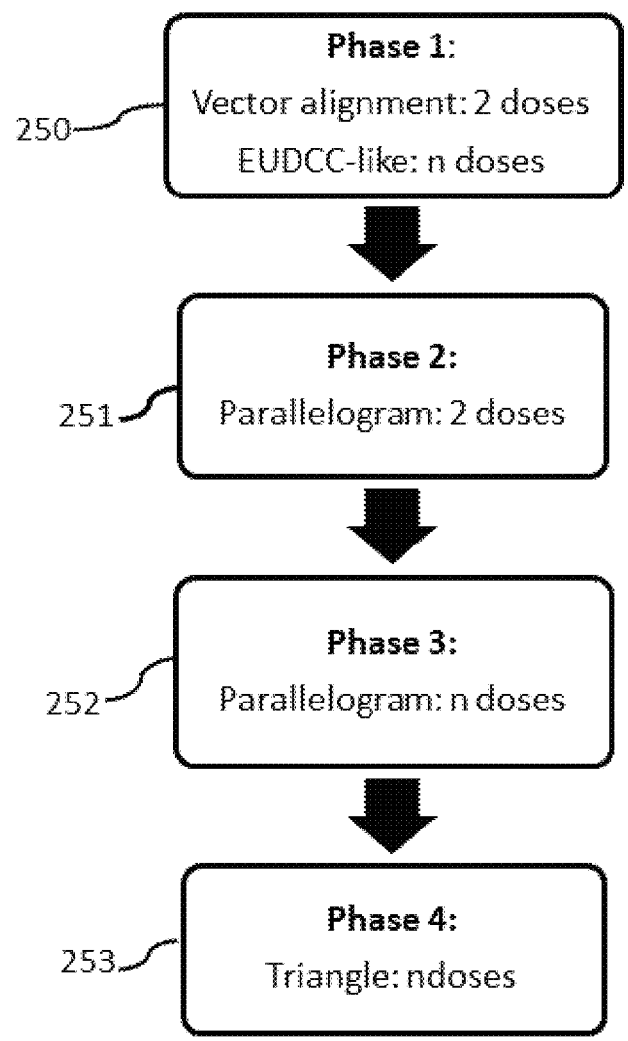
FIG. 14 illustrates an example of steps performed when applying a latent shape detection module like the one schematically illustrated by FIG. 13.

An example of steps performed to a latent shape detection algorithm is illustrated by FIG. 14. Assume information of 1 vaccine dose (date & name) will form a vector Symmetric layout: an activity to find 2 vectors of the same properties (length and direction) EUDCC: 1 vector and a vaccine dose indicator may be performed in a phase 1 activity 250.

To improve accuracy on extracted vectors & extend to n-dose case 2 doses: a check if 4 points (date 1, date 2, name 1, name 2) form a parallelogram n doses: combination of n identical and related parallelograms may be performed in a phase 2 and phase 3 activities 251 and 252.

In a phase 4, it may be checked if three points form a triangle structure (date 1, name 1, final dose indicator etc.).

These phases 1 to 4 are further described in conjunction with FIGS. 17 to 20 below.

Figure 15:
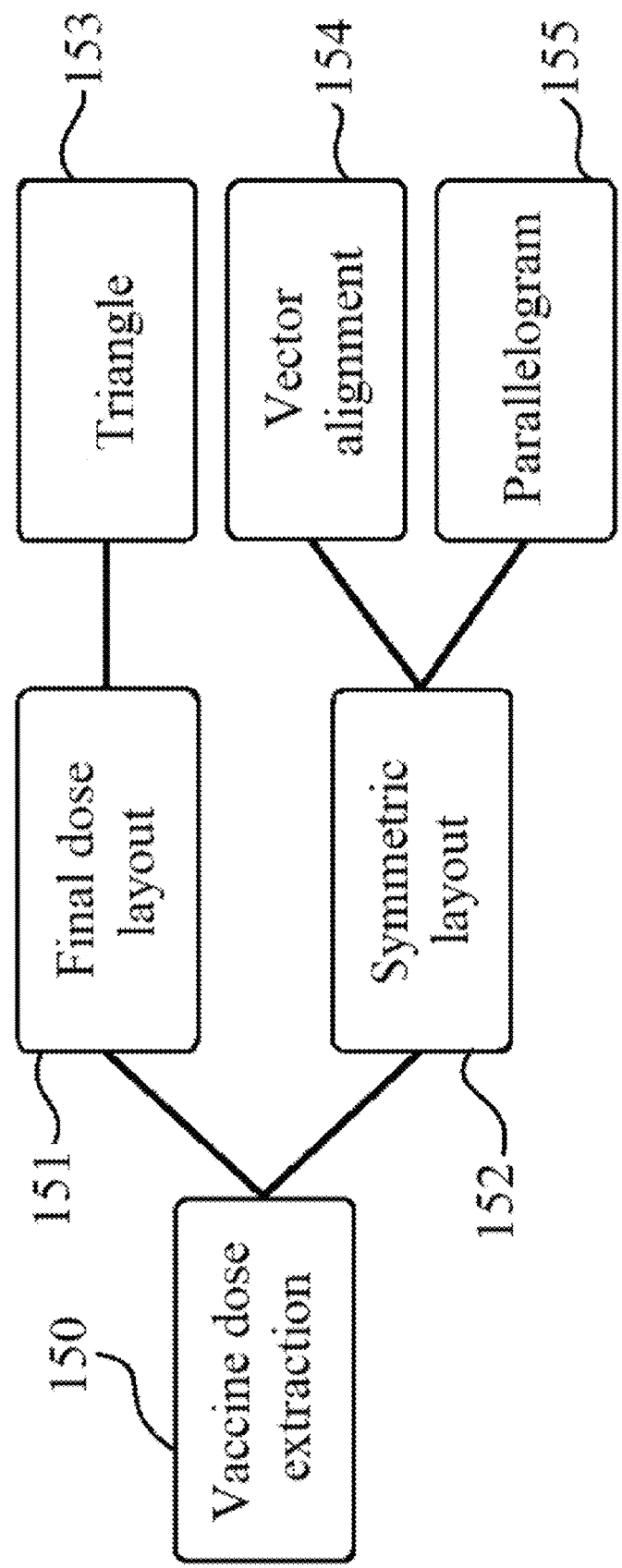
FIG. 15 illustrates a schematic block diagram for vaccine dose extraction from a document used in the ranking of visual/layout properties of a text cluster and/or separate vaccine dose extraction.

A schematic block diagram for vaccine dose extraction from a document used in the ranking of visual/layout properties of a text cluster and/or separate vaccine dose extraction is illustrated by FIG. 15.

Vaccine dose extraction 150 may comprise here considering the final dose layout 151 or the symmetric layout 152 on the document. The final dose layout 151 on the document may relate to the presentation of vaccine dates/vaccine names along with a marker of a final dose, e.g., 3/3, 3 of 3 or the like.

Figure 20:
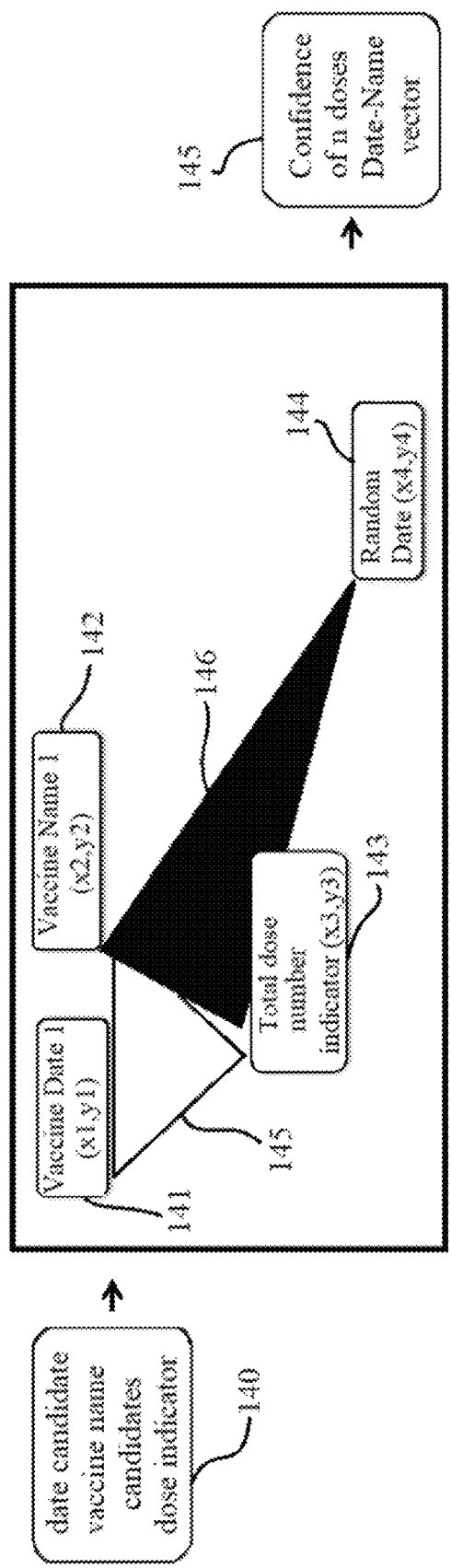
FIG. 20 illustrates an example of using document patterns in the visual property/layout ranking considering the alignment of vaccination related keywords for n vaccination doses along a triangle for determining the confidence of n dose date-name vectors identified in the visual property/layout ranking.

For identifying and evaluating the confidence of a final dose layout 151 type of text clusters the arrangement of text clusters may be assessed according to a triangle 153, wherein text clusters comprising predefined keyword candidates form the corner points of said triangle (see FIG. 20).

The confidence of a final dose layout corresponds to the probability that the pattern of text clusters identified indeed corresponds to a final dose layout.

Figure 18:
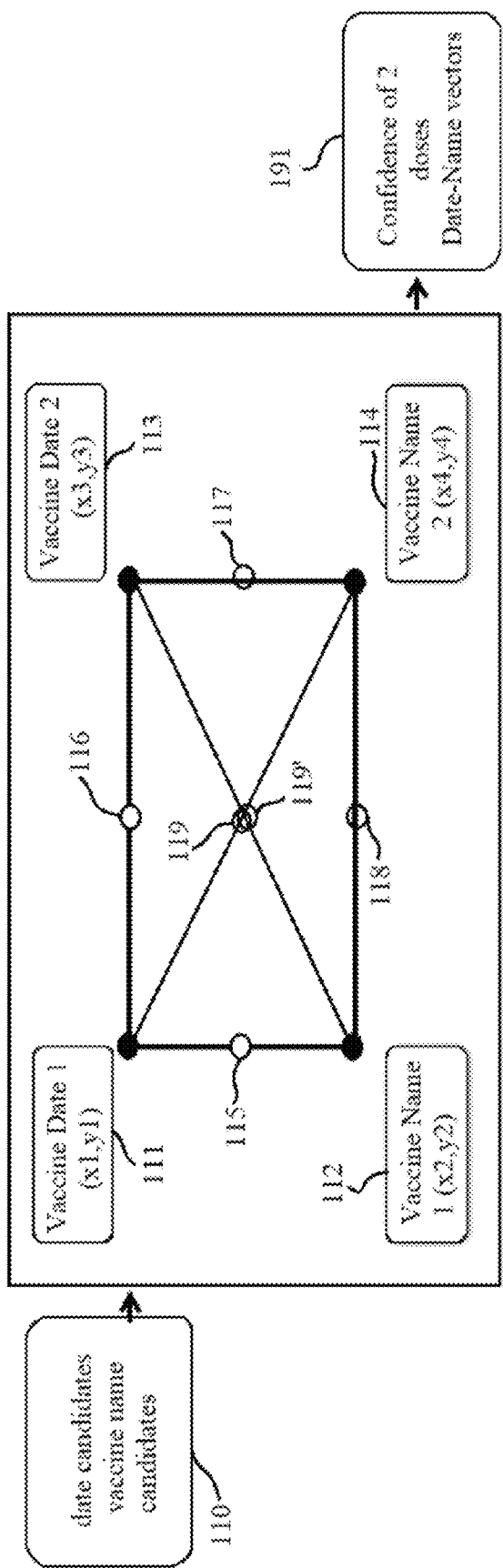
FIG. 18 illustrates an example of using document patterns in the visual property/layout ranking considering the alignment of vaccination related keywords for two vaccination doses along a parallelogram for determining the confidence of two dose date-name vectors identified in the visual property/layout ranking.
Figure 19:
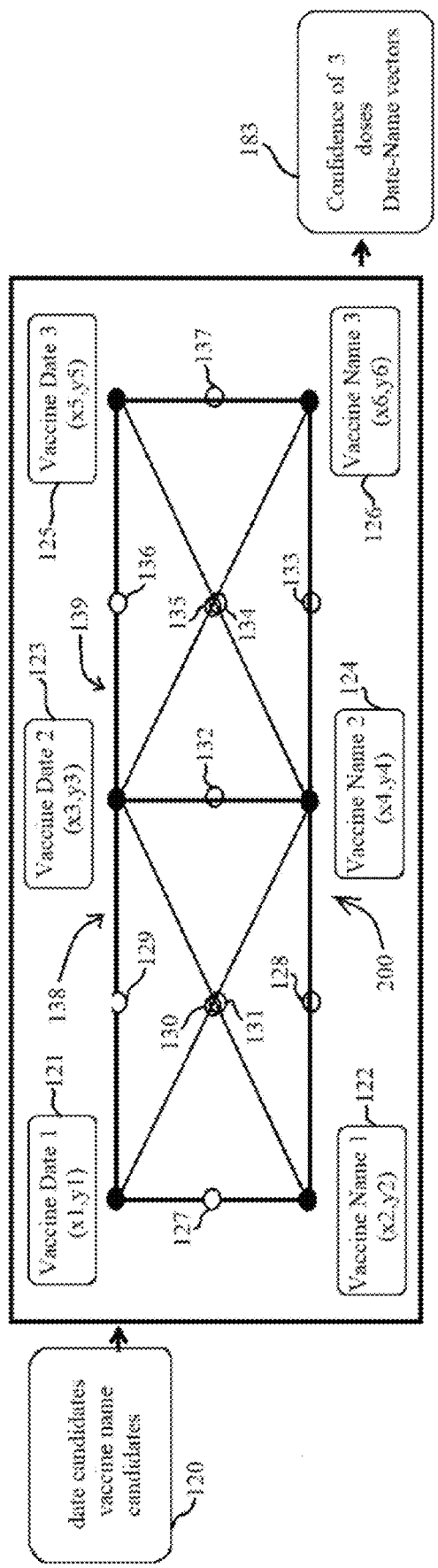
FIG. 19 illustrates an example of using document patterns in the visual property/layout ranking considering the alignment of vaccination related keywords for three vaccination doses along a parallelogram for determining the confidence of three dose date-name vectors identified in the visual property/layout ranking.

For identifying and evaluating the confidence of a symmetric layout 152 type of text clusters to correspond to a vaccination date-name matrix on a vaccination certificate, the arrangement of the text clusters may either be assessed according to vector alignment 154 of (pairs of) text clusters according to a coordinate system (see FIG. 15) or according to a parallelogram 155, wherein text clusters comprising predefine keyword candidates form the corner points of said parallelogram(s) (see FIGS. 18, 19).

Figure 16:
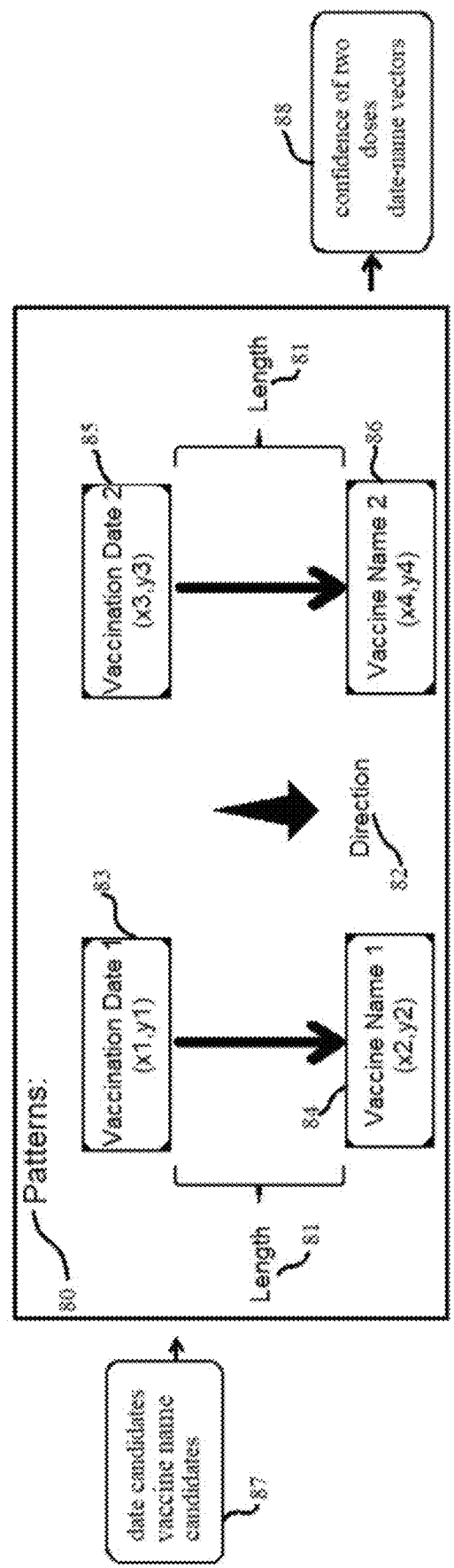
FIG. 16 illustrates an example of using document patterns along with pre-known date candidates and vaccine name candidates for determining the confidence of a date-name vector identified in the visual property/layout ranking.

An example of using document patterns along with pre-known date candidates and vaccine name candidates for determining the confidence of a date-name vector identified in the visual property/layout ranking is illustrated by FIG. 16.

The patterns 80 considered in FIG. 14 are the same as those depicted and described in conjunction with FIG. 12.

When analyzing these patterns, a predetermined list of date candidates and vaccine name candidates are received by the method. Date candidates are, for example, 18/06/2022, 06/18/2022 etc. Vaccine candidates are for example: "Biontech", "Comirnaty", "Moderna" "Spikevax" etc.

Analyzing the pattern 80 according to length 81 and direction 81 results in a confidence of two doses date-name vectors 88. This confidence 88 represents a probability that two pairs of clusters 83, 84 and 85, 86 indeed correspond to vaccination date and vaccination name pairs.

The confidence 88 may be calculated by the following formula:

$$\text{Confidence} = \frac{\text{Euclidean similarity} + \text{Cosine similarity}}{2}$$

The Euclidean similarity and the cosine similarity may refer to a similarity between the pair of text clusters 83, 84 to the pair of text clusters 85, 86. The Euclidean similarity as well as the Cosine similarity may however also refer to a similarity of the pairs of text clusters 83, 84 and 86 to respective pairs of template text clusters that are known to form a valid vaccination date and vaccination name pair.

The concepts of Euclidean similarity and cosine similarity are not explained here further, since they are known to the skilled person.

The resulting confidence is considered in the ranking of the text clusters forming the vaccination date, vaccination date pairs, such that a high confidence leads to a high ranking with respect to visual properties/layout.

Figure 17:
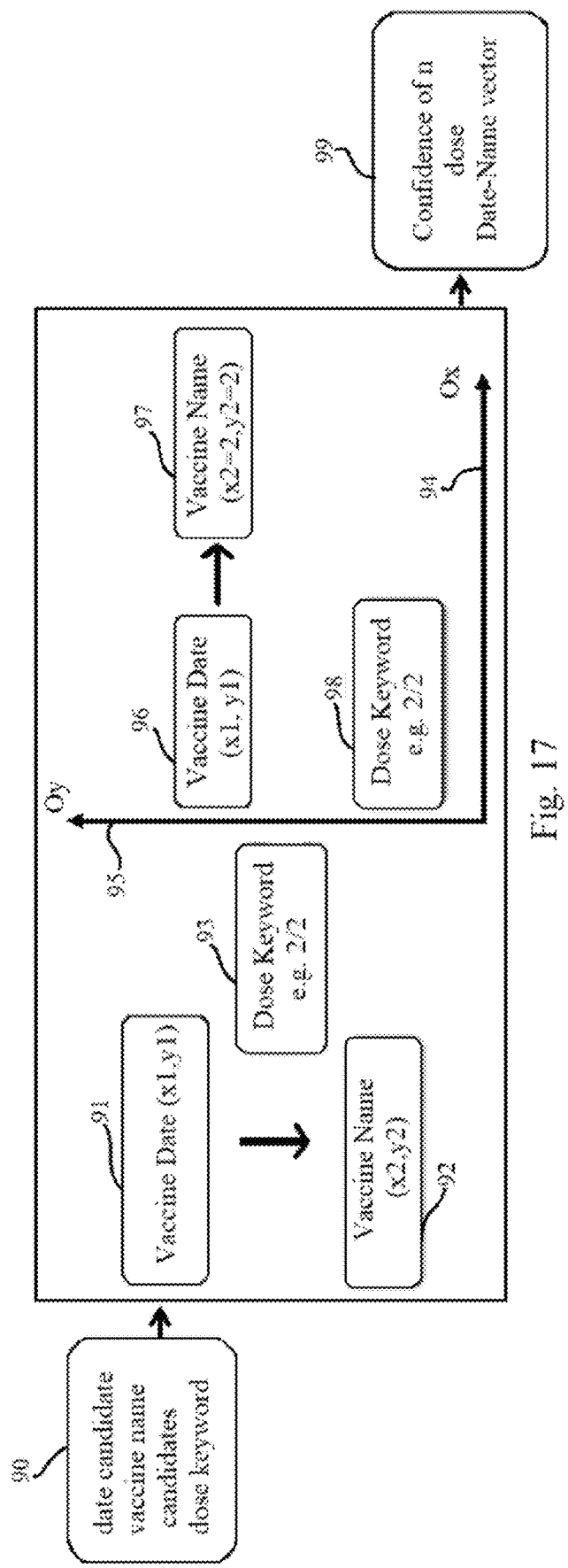
FIG. 17 illustrates an example of using document patterns in the visual property/layout ranking considering the alignment of vaccination related keywords along the axis of a coordinate system, for determining the confidence of a date-name vector identified in the visual property/layout ranking.

An example of using document patterns in the visual property/layout ranking considering the alignment of vaccination related keywords along the axis of a coordinate system, for determining the confidence of a date-name vector identified in the visual property/layout ranking, is illustrated by FIG. 17.

Predetermined date candidates, vaccine name candidates, and dose keyword candidates are fed to an analysis of text clusters identified on a document. Using these predetermined candidates 90 it is identified that there is a vaccine date 91 at coordinates (x1, y1) on the document and that there is a vaccine name 92 at coordinates (x2, y2) on the document. The coordinates (x1, y1) as well as (x2, y2) are coordinates in a coordinate system spanned by perpendicular coordinate axis Ox 94 and Oy 95.

It is also identified that between and slightly displaced from these vaccine date and vaccine name text clusters 91, 92 there is a dose keyword text cluster 92, for example, "2/2", "2 of 2", "2 von 2" etc., which is indicative of a completed vaccination series with two doses received.

In this scenario, the vaccine date 91 coordinates (x1, y1) and the vaccine name 92 coordinates (x2, y2) form a vector that is (practically) perfectly aligned with coordinate axis Oy 95.

In a different scenario, the identified vaccine date 96 coordinates (x1, y1) and the vaccine name coordinates 97 (x2, y2) are located above another dose keyword 98 and the vaccine date 96 coordinates (x1, y1) and vaccine name 97 coordinates (x2, y2) form a vector that is aligned with the Ox axis 94.

The confidence 99 of n dose date-name vectors (here one vaccine name, vaccine date vector in each scenario) is calculated here as a measure of alignment of these vectors with a coordinate axis Ox, Oy of a coordinate system with perpendicular axis. The measure of the alignment may be calculated by determining an angle between the axis Ox, Oy and the vector formed by the vaccine date and vaccine name coordinates. Small angles stand for a high confidence related to alignment.

The confidence is, for example, calculated using the following formula:

$$\text{Confidence} = \text{average}(1, \text{confidence aligned with } Ox/Oy),$$

wherein confidence aligned with Ox/Oy is the above-mentioned confidence related to alignment.

The resulting confidence is considered in the ranking of the text clusters forming the vaccination date, vaccination date pairs, such that a high confidence leads to a high ranking with respect to visual properties/layout. The confidence of the respective date-name pairs may be transferred to downstream applications in order to identify the correct date-name pairs (and vectors) there at once.

An example of using document patterns in the visual property/layout ranking considering the alignment of vaccination related keywords for two vaccination doses along a parallelogram for determining the confidence of two dose date-name vectors identified in the visual property/layout ranking, is illustrated by FIG. 18.

Like illustrated in FIGS. 16 and 17, date candidates as well as vaccine name candidates 110 are received by the method.

Using these candidates, the method recognizes a vaccine date 1 111 at coordinates (x1, y1) on the document as well as a vaccine name 1 112 at coordinates (x2, y2) and a vaccine date 2 113 at coordinates (x3, y3) and a vaccine name 2 114 at coordinates (x4, y4).

As can be seen in FIG. 16, the coordinates of the respective vaccine dates and vaccine names (x1, y1), (x2, y2), (x3, y3), (x4, y4) correspond to corner points of a parallelogram (depicted in FIG. 16 as filled out dots)

The method to determine the confidence of 2 doses date name vectors as depicted in FIG. 16 uses mid point coordinates between the vaccine name/vaccine date text clusters 111, 112, 113, 114. In doing so the coordinates of the following mid-points are determined: The mid-point 115 between the text clusters 11 and 112, the mid-point 118 between text clusters 112 and 114, the mid-point 116 between text clusters 111 and 113, the mid-point 117 between text clusters 113 and 114, the mid-point 119 between text clusters 111 and 114, and the mid-point 119' between the text clusters 114 and 111. In the arrangement depicted by FIG. 16, the mid-points 119 and 119' form centre points of the parallelogram spanned by the vaccine date and vaccine name coordinates (x1, y1), (x2, y2), (x3, y3), (x4, y4).

The confidence of a vaccine date and a vaccine name belonging to a valid vaccine date/vaccine name pair represented by a date-name vector is, for example, calculated as follows:

Confidence=1−normalized distance of 2 closest mid-points.

In the example illustrated by FIG. 16, the two closest mid points are the mid points 119 and 119'. Since the four vaccine name/vaccine date boxes in the arrangement according to FIG. 18 nearly form a perfect rectangle, the distance between those two closest mid-points is minimal and the confidence 191 for the entire parallelogram arrangement (and therefore for the 2 doses date name vectors) is close to a value of 1.

The resulting confidence is considered in the ranking of the text clusters forming the vaccination date, vaccination date pairs, such that a high confidence leads to a high ranking with respect to visual properties/layout. The confidence of the respective date-name pairs may be transferred to downstream applications in order to identify the correct date-name pairs (and vectors) there at once.

An example of using document patterns in the visual property/layout ranking considering the alignment of vaccination related keywords for three vaccination doses along a parallelogram for determining the confidence of three dose date-name vectors identified in the visual property/layout ranking is illustrated by FIG. 19.

Like in the method described in conjunction with FIG. 18, using date candidates and vaccine name candidates 120, coordinates (x1, y1) of a vaccine date 1 121, a vaccine name 1 122 (x2, y2), a vaccine date 2 123 (x3, y3), a vaccine name 2 124 (x4, y4), a vaccine date 3 125 (x5, y5), a vaccine name 3 (x6, y6).

The coordinates of these vaccine names and vaccine dates together form a big parallelogram 200 (corner points: (x1, y1), (x2, y2), (x5, y5), (x6, y6)), which includes two smaller parallelograms: parallelogram 138 (corner points: (x1, y1), (x2, y2), (x3, y3), (x4, y4)), and parallelogram 139 (corner points: (x3, y3), (x4, y4), (x5, y5), (x6, y6)). Similar to FIG. 16, the coordinates of the mid points 127 to 137 between the vaccine name/vaccine date text clusters of parallelograms 138 and parallelogram 139 are determined.

To determine the confidence of the parallelogram arrangement of FIG. 19, the combination of n−1 (here the expected amount of doses is 3, therefore n=3) parallelograms is created (hence, the two parallelograms 139, 138 are determined).

The confidence may be calculated in this case as follows:

$$\text{Confidence} = \frac{\text{Parallelogram } conf + \text{Identity } conf + \text{Inclusivity } conf}{3}.$$

Here the parallelogram confidence is calculated as an average of the parallelogram confidences for the two smaller parallelograms 138 and 139 included by the big parallelogram 200. The confidences for the smaller parallelograms 138 and 139 may be calculated as explained in conjunction with FIG. 18.

The identity confidence may be calculated as:

$$\text{identity confidence} = \frac{\text{sum of min parallelogram areas}}{\text{max parallelogram area}}.$$

The sum of min parallelogram areas corresponds to the sum of the areas of parallelograms 138 and 139 in this example.

The inclusivity confidence is defined as 1 if the two smaller parallelograms 138 and 139 share a common edge, else the inclusivity confidence is set to 0.

In the example of FIG. 19, the parallelograms 138 and 139 share a common edge between points (x3, y3) and (x4, y4). In total, the confidence for the arrangement shown in FIG. 19 is closed to one and therefore high.

The resulting confidence is considered in the ranking of the text clusters forming the vaccination date, vaccination date pairs, such that a high confidence leads to a high ranking with respect to visual properties/layout. The confidence of the respective date-name pairs may be transferred to downstream applications in order to identify the correct date-name pairs (and vectors) there at once.

An example of using document patterns in the visual property/layout ranking considering the alignment of vaccination related keywords for n vaccination doses along a triangle for determining the confidence of n dose date-name vectors identified in the visual property/layout ranking, is illustrated by FIG. 20.

When identifying a vaccine date, vaccine name and total dose text cluster arrangement according as illustrated by FIG. 20, date candidates, vaccine name candidates and a dose indicator candidates 140 are received by the method as well.

Using these indicators, a vaccine date 1 141 at coordinates (x1, y1), a vaccine name 1 at coordinates (x2, y2) as well as a total dose number indicator at coordinates (x3, y3) and a random date at coordinates (x4, y4) is identified.

To identify the confidence of n dose-name vector(s) triangles between the coordinates of these text clusters are built: A first triangle 145 between vaccine date 1 (coordinates: (x1, y1)), vaccine name 1 (coordinates: (x2, y2)) and a total dose number indicator (coordinates (x3, y3)), and a second triangle 146 between the vaccine name 1 (coordinates: (x2, y2)), the total dose number indicator (coordinates: (x3, y3)) and the random date (coordinates: (x4, y4)). In general, arbitrary combinations of text clusters could be used to form such triangles, such as arbitrary date, vaccine name, and dose indicator combinations.

A check may be performed if the dose indicator is valid (and not a footer). The area of the selected triangles is calculated. In the example of FIG. 20, the area of the first triangle 145 and the area of the second triangle 146 is calculated. The triangle with the smallest area is identified (here: first triangle 145).

Based on the identification of the triangle with the smallest area, the confidence of a n doses date-name vector may be calculated according to the following formula:

Confidence=1−normalised smallest triangle area.

A penalty term may be added for sparse documents (documents with a low word count).

The resulting confidence is considered in the ranking of the text clusters forming the vaccination date, vaccination date pairs, such that a high confidence leads to a high ranking with respect to visual properties/layout. The confidence of the respective date-name pairs may be transferred to downstream applications in order to identify the correct date-name pairs (and vectors) there at once.

Figure 21:
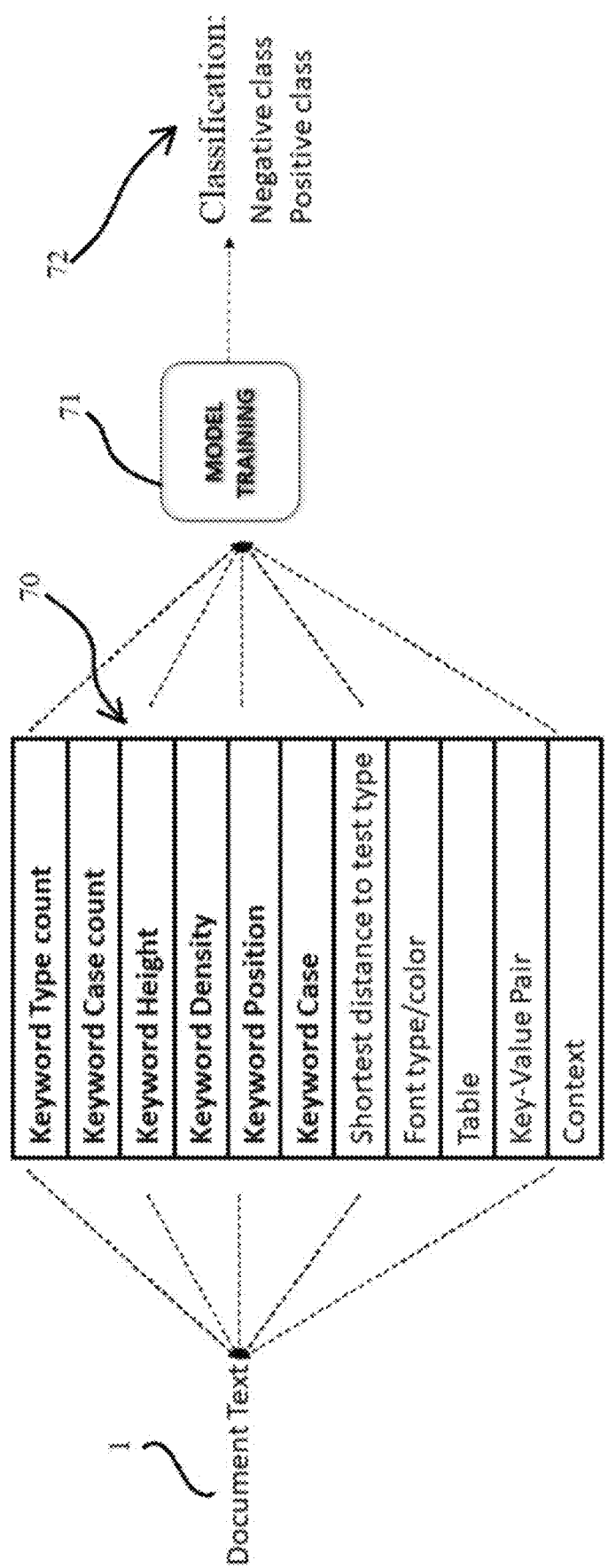
FIG. 21 illustrates an example of a schematic block diagram of a feature vector extracted from a document used for model training to classify a document.

A schematic block diagram of an example of a feature vector extracted from a document used for model training to classify a document is illustrated by FIG. 21.

The following features are extracted from a document text 1: keyword type count (counting the number of appearances of certain keywords like "positive" or "negative"), keyword case count (counting the appearances of a keyword with e.g., upper case), keyword height (corresponding to font-size of a keyword), keyword density (e.g., word density around a keyword), keyword position, or keyword case (upper case keywords ranked higher than lower case keywords). Further features extracted may be: the shortest distance to test type, font type/color, table, key-value pair, context. All features together may form at least one feature vector 70.

These feature vectors may be extracted using a specifically trained neural network (e.g., convolutional neural network, recurrent neural network) to recognize which features should be extracted and put into at least one feature vector 70 to enable the method to correctly classify a document.

For this purpose, for example, reinforcement learning could be used. In reinforcement learning a task (here: the correct classification of a document into a "positive" or "negative" class document) is carried out by an agent (the model deciding which feature to use) which receives a reward if a choice of at least one particular feature vector 70 populated with particular features leads to the correct document classification.

Basics of reinforcement learning can be found in "Reinforcement Learning" by Richard S. Sutton and Andrew G. Barto, published by the MIT Press in 1998. Several strategies for leaning the correct feature vectors to use can be used like the namely the Epsilon-Greedy strategy and the Softmax strategy to be used in the learning phase.

Also supervised learning may be used, meaning that human experts define the features to be extracted form a document beforehand by marking them on the document (e.g., marking all appearances of a keyword or only visually attractive appearances of a keyword). The features with which the feature vector is populated would then be predefined. A combination of reinforcement learning and supervised learning approaches may be used to create a feature vector, as well.

The feature vector 70 is then used to in a separate model training step 71, for example, the training of a machine learning model, in particular, an artificial neural network machine learning model. The model training 71 phase may involve the analysis and clustering in view of the classification step 72 from more than 1,000, more than 10,000 different documents or more than 1,000,000 documents.

This training again may involve supervised or unsupervised learning approaches or a mix between supervised an unsupervised learning (see above).

Alternatively, also a Bayes classification based on cluster analysis or the like may be used by the machine learning model.

After the model training 71, the trained model—may be applied to document 1, such like the documents 1', 1" 1'" discussed above. The trained model may identify a correct ranking of text clusters (information importance order module 10—see FIG. 1) and may input these ranked clusters into a downstream application that performs the final classification 72 of the documents into e.g., a "positive" or "negative" class of Covid 19 test documents.

Figure 22:
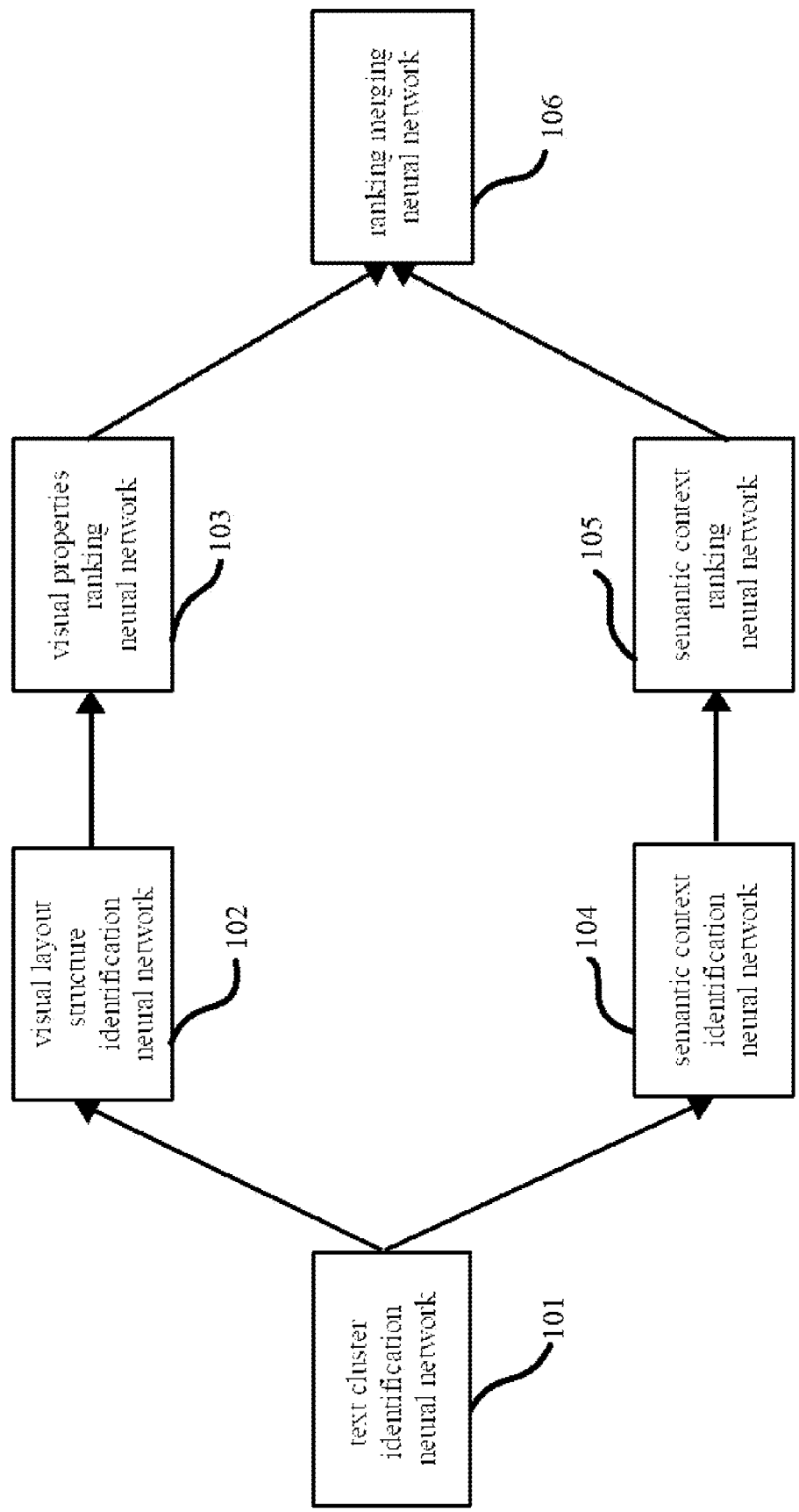
FIG. 22 illustrates an example of artificial neural networks used to implement an information importance order module as shown in FIG. 1.

An example of artificial neural networks that may be trained this way and may be used to implement an information importance order module is illustrated by FIG. 22.

A text cluster identification neural network 101 is used to identify the text clusters on a document 1. The text cluster identification neural network 101 may a convolutional neural network based on YOLO producing bounding boxes around text clusters to be further analysed.

The identified text clusters are then fed to two branches of networks that are operated in parallel. The first branch of neural networks includes a visual layout structure identification neural network 102 and a visual properties ranking neural network 103. The second branch of neural networks includes a semantic context identification neural network 104 and a semantic context ranking neural network 105.

The visual layout structure identification neural network 102 may identify patterns 80 (see FIGS. 12 to 20) on the document as well as perform feature vector extraction to build a feature vector (see FIG. 21). The visual properties ranking neural network may rank the text clusters according to the identified visual layout structure by neural network 102 (see FIG. 2, FIGS. 8 to 11).

In parallel, a semantic context identification neural network 104 identifies the semantic context of the identified text clusters and the semantic context ranking neural network 105 ranks said text clusters according to their semantic context in relation to a given semantic context (see FIGS. 3 and 4).

The two rankings obtained by the two neural network branches are then fed to a ranking merging neural network 106, which obtains a total ranking of the text clusters to be sent to a downstream application (see FIGS. 5 and 6).

The separate neural networks 101 to 106 are each individually pre-parametrized and individually trained neural networks. Each neural network may be trained using reinforcement learning and/or supervised learning and/or unsupervised learning.

Figure 23A:
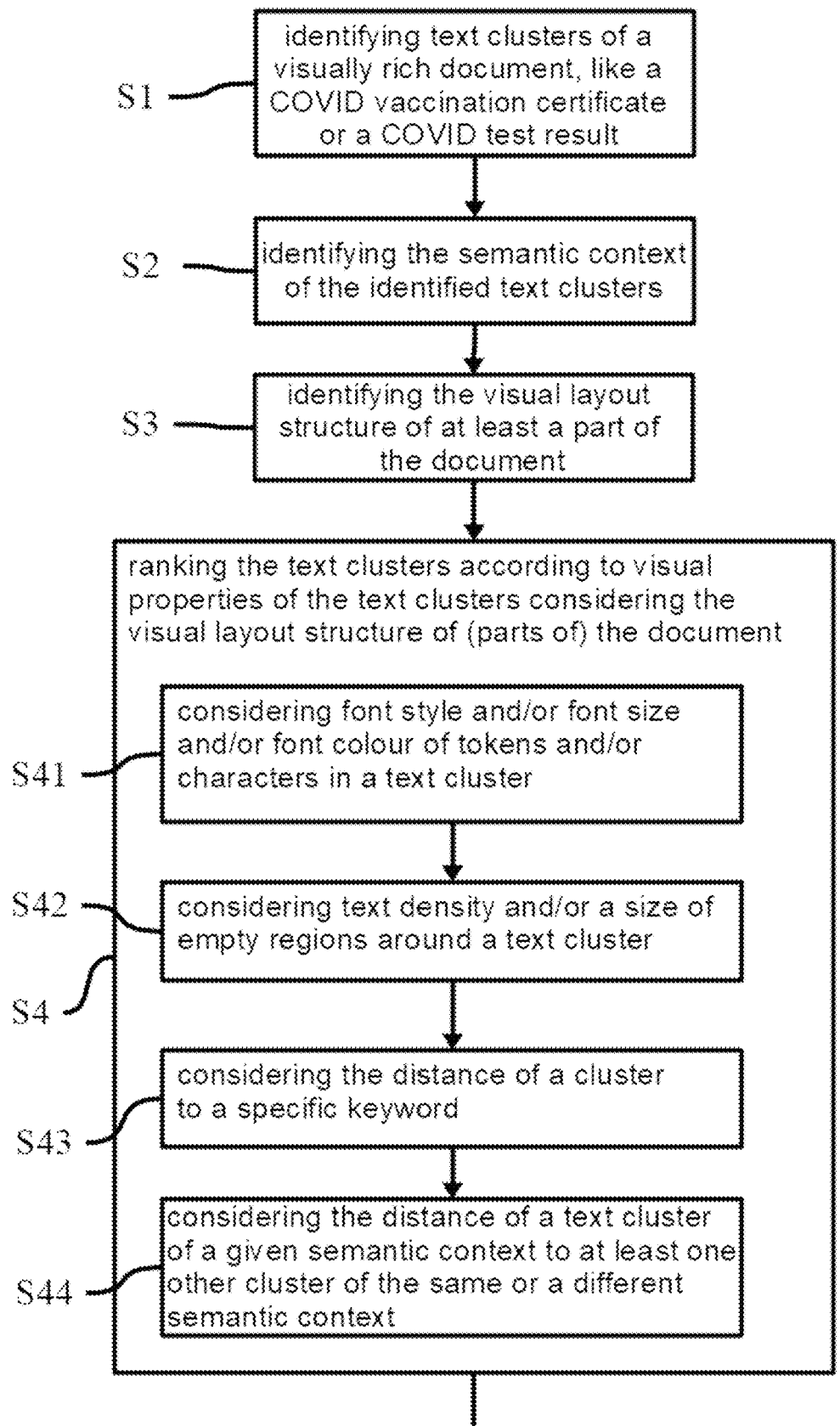
FIGS. 23A and 23B is a schematic block diagram of the computer-implemented method of extracting, ranking and further processing information extracted from a document.
Figure 23B:
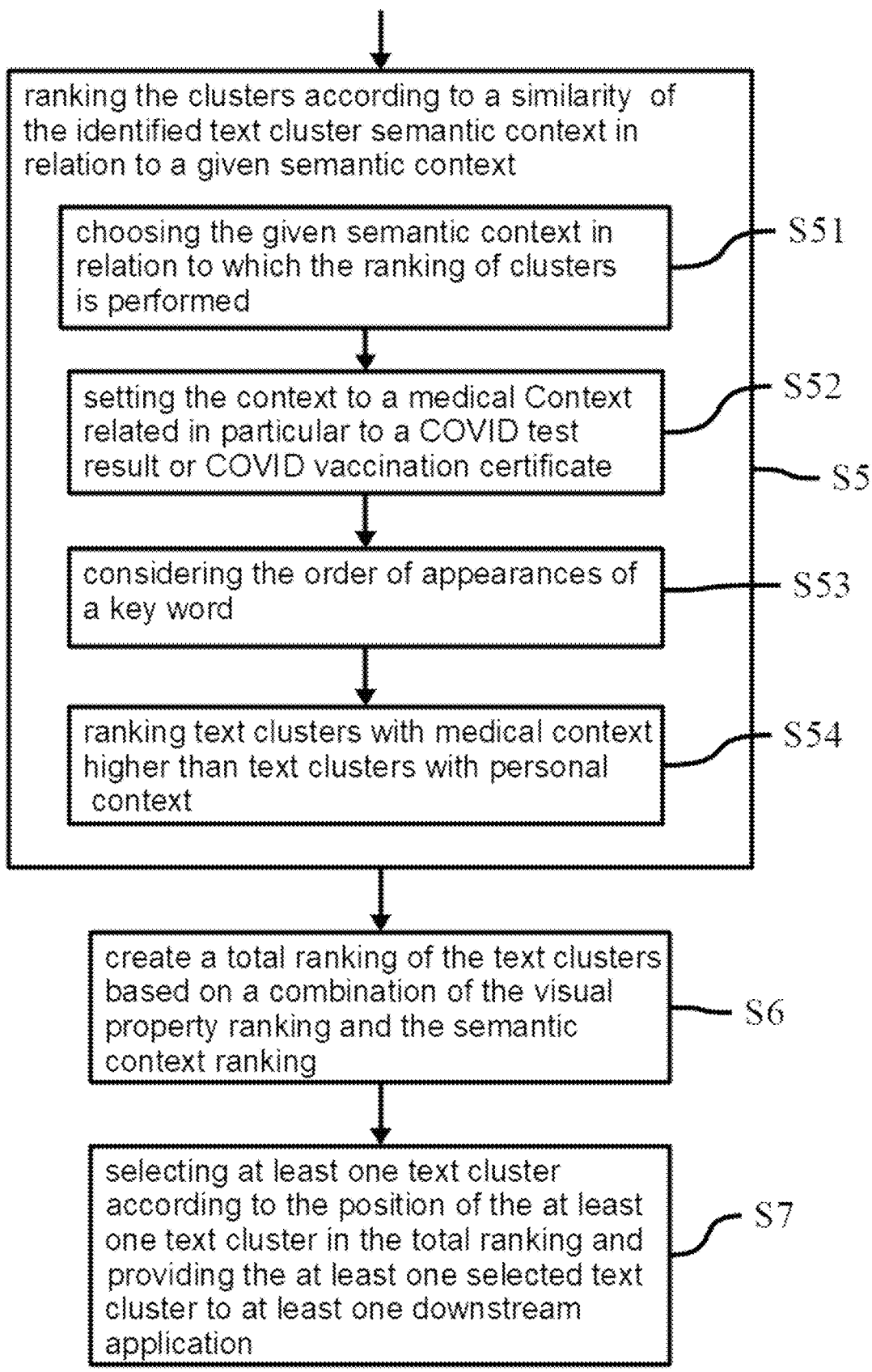

A schematic block diagram of the computer-implemented method of extracting, ranking and further processing information extracted from a document is illustrated by FIGS. 23A and 23B.

The method includes an activity S1 of identifying text clusters of a visually rich document, like a Covid 19 vaccination certificate or a Covid 19 test result as well as an activity S2 of identifying the semantic context of the identified text clusters and an activity S3 of identifying the visual layout structure of at least a part of the document (this part of the document includes the text clusters).

The method further includes an activity S4 of ranking the text clusters according to visual properties of the text clusters considering the visual layout structure of (parts of) the document. This activity S4 includes an activity S41 of considering font style and/or font size and/or font color of tokens and/or characters in a text cluster. The activity S4 further includes the activity S42 of considering text density and/or a size of empty regions around a text cluster and an activity S43 of considering the distance of a cluster to a specific keyword and an activity S44 of considering the distance of a text cluster of a given semantic context to at least one other cluster of the same or different semantic context.

The method further includes an activity S5 of ranking the clusters according to a similarity of the identified text cluster semantic context in relation to a given semantic context. The activity S5 includes an activity S51 of choosing the given semantic context in relation to which the ranking of the clusters is performed. The method further involves an activity S52 of setting the semantic context to a medical context related in particular to a Covid 19 test result or Covid 19 vaccination certificate as well as the activities S52 of considering the order of appearances of a key word and S54 of ranking text clusters with medical context higher than text cluster with personal context.

The method also involves an activity S6 of creating a total ranking of the text clusters based on a combination of the visual property ranking and the semantic context ranking and an activity S7 of selecting at least one text cluster according to the position of the at least one text cluster in the total ranking and providing the at least one selected text cluster to at least one downstream application.

Figure 24:
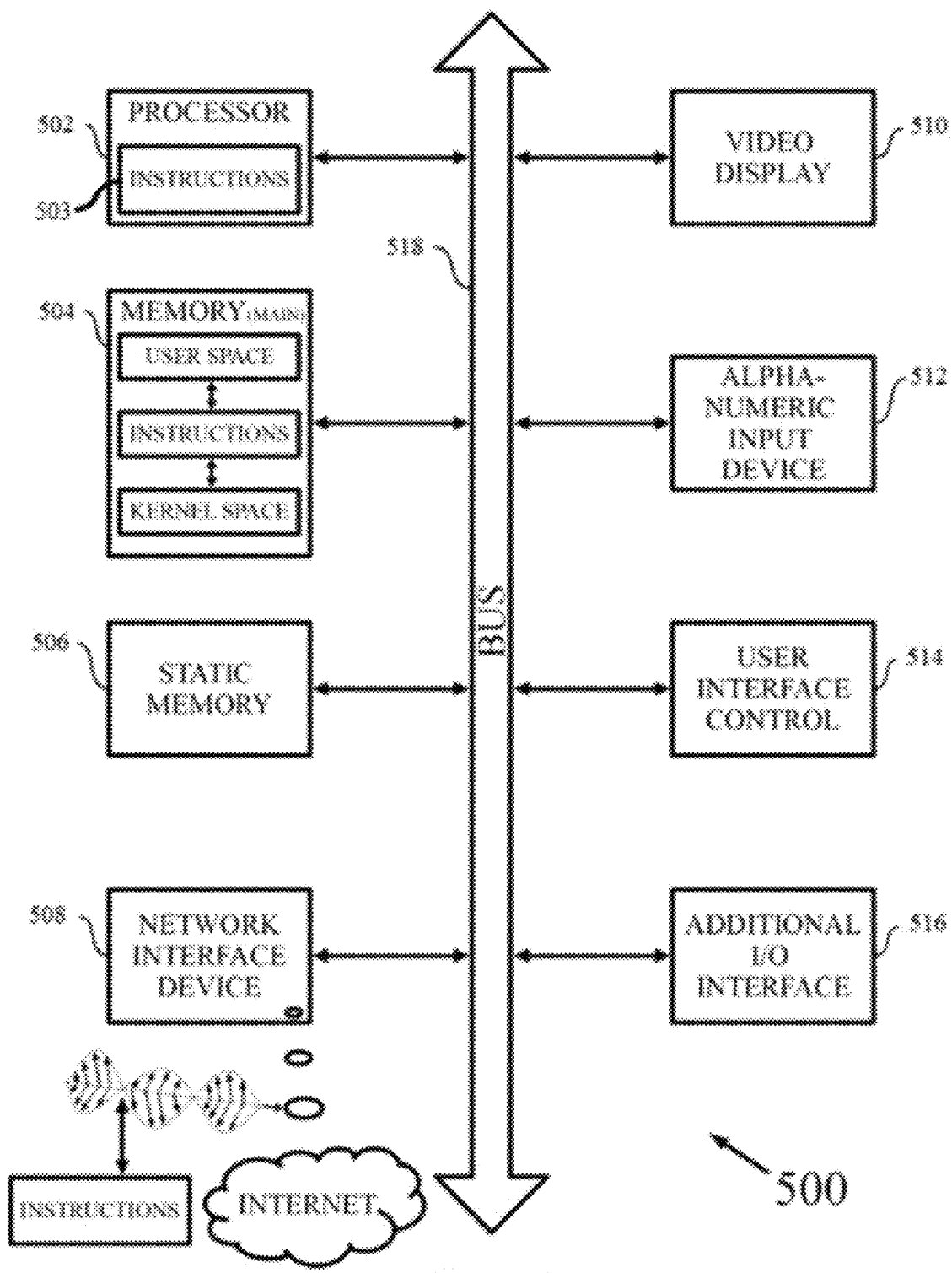
FIG. 24 schematically illustrates an example of a computerized system on which the methods illustrated by FIGS. 1 to 23 are implemented.

A diagrammatic representation of an exemplary computer system 500 is shown in FIG. 24. The processor 502 is arranged to execute a set of instructions 503, to cause the computer system 500 to perform any of the methodologies used for the method of automatically identifying, ranking, and processing information obtained from a document, as described herein. The computers of the distributed computer system performing the tasks of said automatically identifying, ranking, and processing information obtained from a document might be arranged like this.

The computer system 500 includes a processor 502, a main memory 504 and a network interface 508. The main memory 504 includes a user space, which is associated with user-run applications, and a kernel space, which is reserved for operating-system- and hardware-associated applications. The computer system 500 further includes a static memory 506, e.g., non-removable flash and/or solid-state drive and/or a removable Micro or Mini SD card, which permanently stores software enabling the computer system 500 to execute functions of the computer system 500. Furthermore, it may include a video display 510, a user interface control module 514 and/or an alpha-numeric and cursor input device 512. Optionally, additional I/O interfaces 516, such as card reader and USB interfaces may be present. The computer system components 502 to 516 are interconnected by a data bus 518.

In some exemplary embodiments the software programmed to carry out (parts of) the method described herein is stored on the static memory 506; in other exemplary embodiments, external databases are used.

An executable set of instructions (i.e. software) 503 embodying any one, or all, of the methodologies described above, resides completely, or at least partially, permanently in the non-volatile memory 506. When being executed, process data resides in the main memory 504 and/or the processor 502.

What is claimed is:

1. A computer-implemented method performed by a plurality of separate artificial neural networks, the method comprising:
    identifying, via a text cluster identification neural network, text clusters of a document, wherein the text cluster identification neural network is a convolutional neural network used to identify the text clusters on a document producing bounding boxes around text clusters to be further analyzed;
    identifying, via a visual layout structure identification neural network, a visual layout structure of at least one part of the document;
    ranking, via a visual properties ranking neural network, the text clusters according to visual properties of each text cluster to obtain a visual property ranking based at least in part on the visual layout structure;
    identifying, via a semantic context identification neural network, a semantic context of the text clusters;
    ranking, via a semantic context ranking neural network, the text clusters to obtain a semantic context ranking based on a similarity of the semantic context of each text cluster in relation to a given semantic context, wherein the identified text clusters are fed to two branches of neural networks that are operated in parallel, the first branch comprising the visual layout structure identification neural network and the visual properties ranking neural network, and the second branch comprising the semantic context identification neural network and the semantic context ranking neural network;
    creating, via a ranking-merging neural network, a total ranking of the text clusters based on a combination of the visual property ranking and the semantic context ranking;
    selecting at least one of the text clusters based on a position of the at least one of the text clusters in the total ranking; and
    providing the selected at least one of the text clusters and a given number of highest ranked clusters to at least one downstream application, thereby limiting the number of processed clusters by the downstream application to the selected at least one of the text clusters, wherein each of the plurality of separate neural networks is individually pre-parametrized and individually trained neural networks.

2. The computer-implemented method of claim 1 wherein a font style, a font size, a font color of tokens, or characters in each text cluster is considered when ranking the text clusters according to the visual properties.

3. The computer-implemented method of claim 1 wherein a text density or a size of empty regions around each text cluster is considered when ranking the text clusters according to the visual properties.

4. The computer-implemented method of claim 1 wherein an order of appearances of a keyword within the document is considered when ranking the text clusters according to the similarity of the semantic context of each text cluster in relation to a given semantic context.

5. The computer-implemented method of claim 1 wherein a distance of a text cluster to a specific keyword is considered when ranking the text clusters according to the visual properties including the visual layout structure or when ranking the text clusters according to the similarity of the semantic context of each text cluster in relation to the given semantic context.

6. The computer-implemented method of claim 1 wherein the identification of the semantic context of a text cluster is performed before the ranking of the visual properties of the text cluster including the visual layout structure, and a distance of a text cluster of a given semantic context to at least one other text cluster of the same or a different given semantic context is considered when ranking the text clusters according to the visual properties including the visual layout structure.

7. The computer-implemented method of claim 1 wherein the identification of the semantic context of a text cluster is performed before the ranking of the visual properties of the text cluster including the visual layout structure, and a vector alignment of text clusters of a given semantic context to other text clusters of a given semantic context is considered when ranking the text clusters according to the visual properties including the visual layout structure.

8. The computer-implemented method of claim 7 wherein considering the vector alignment of text clusters comprises:
checking whether text clusters of the same or a similar context are aligned along axes of a coordinate system with coordinate axes that are perpendicular to one another.

9. The computer-implemented method of claim 1 wherein the identification of the semantic context of a text cluster is performed before the ranking of the visual properties of the text cluster including the visual layout structure, and alignment of text clusters of a given sematic context according to at least one parallelogram is considered when ranking the text clusters according to the visual properties including the visual layout structure.

10. The computer-implemented method of claim 1 wherein the identification of the semantic context of a text cluster is performed before the ranking of the visual properties of the text cluster including the visual layout structure, and alignment of text clusters of a given semantic context according to at least one triangle is considered when ranking the text clusters according to the visual properties including the visual layout structure.

11. The computer-implemented method of claim 1 wherein, when ranking the text clusters according to semantic context, the text clusters with a medical semantic context are ranked higher than text clusters with a personal semantic context.

12. The computer-implemented method of claim 1 wherein further processing the text clusters according to the position of each text cluster in the total ranking comprises:
using a given number of highest ranked text clusters as input to a transformer encoder.

13. The computer-implemented method of claim 12 wherein the method is applied to textual content that has already been pre-processed by a single-or multi-head attention function of a transformer encoder and the further processing of the text clusters according to the position of each text cluster in the total ranking is performed by at least one further stage of a transformer encoder.

14. The computer-implemented method of claim 1 wherein the document is a visually rich paper document, and a given context in relation to which the semantic context of the text clusters is ranked is predeterminable by a user.

15. The computer-implemented method of claim 1 wherein the document is a Covid 19 test result or a Covid 19 vaccination certificate, and a given context in relation to which the semantic context of the text clusters is ranked is a medical semantic context.

16. A computerized system configured to utilize a plurality of separate artificial neural networks, the system comprising:
at least one processor; and
at least one non-volatile memory comprising instructions that, upon execution by the at least one processor, cause the at least one processor to:
identify, via a text cluster identification neural network, text clusters of a document, wherein the text cluster identification neural network is a convolutional neural network used to identify the text clusters on a document producing bounding boxes around text clusters to be further analyzed;
identify, via a visual layout structure identification neural network, a visual layout structure of at least one part of the document;
rank, via a visual properties ranking neural network, the text clusters according to visual properties of each text cluster to provide a visual property ranking based at least in part on the visual layout structure;
identify, via a semantic context identification neural network, a semantic context of the text clusters;
rank, via a semantic context ranking neural network, the text clusters to obtain a semantic context ranking based on a similarity of the semantic context of each text cluster in relation to a given semantic context, wherein the identified text clusters are fed to two branches of neural networks that are operated in parallel, the first branch comprising the visual layout structure identification neural network and the visual properties ranking neural network, and the second branch comprising the semantic context identification neural network and the semantic context ranking neural network;
create, via a ranking-merging neural network, a total ranking of the text clusters based on a combination of the visual property ranking and the semantic context ranking;
select at least one of the text clusters according to a position of the at least one of the text clusters in the total ranking; and
provide the selected at least one of the text clusters and a given number of highest ranked clusters to at least one downstream application, thereby limiting the number of processed clusters by the downstream application to the selected at least one of the text clusters,
wherein each of the plurality of separate neural networks is individually pre-parametrized and individually trained neural networks.

17. The computerized system of claim 16 wherein a font style, a font size, a font color of tokens, or characters in each text cluster is considered when ranking the text clusters according to the visual properties.

18. The computerized system of claim 16 wherein a text density or a size of empty regions around each text cluster is considered when ranking the text clusters according to the visual properties.

19. A non-transitory computer-readable storage medium configured to utilize a plurality of separate artificial neural networks, the non-transitory computer-readable storage medium comprising instructions that, upon execution by a processor of a computing device, cause the computing device to:

identify, via a text cluster identification neural network, text clusters of a document, wherein the text cluster identification neural network is a convolutional neural network used to identify the text clusters on a document producing bounding boxes around text clusters to be further analyzed;

identify, via a visual layout structure identification neural network, a visual layout structure of at least one part of the document;

rank, via a visual properties ranking neural network, the text clusters according to visual properties of each text cluster to provide a visual property ranking based at least in part on the visual layout structure;

identify, via a semantic context identification neural network, a semantic context of the text clusters;

rank, via a semantic context ranking neural network, the text clusters to obtain a semantic context ranking based on a similarity of the semantic context of each text cluster in relation to a given semantic context, wherein the identified text clusters are fed to two branches of neural networks that are operated in parallel, the first branch comprising the visual layout structure identification neural network and the visual properties ranking neural network, and the second branch comprising the semantic context identification neural network and the semantic context ranking neural network;

create, via a ranking-merging neural network, a total ranking of the text clusters based on a combination of the visual property ranking and the semantic context ranking;

select at least one of the text clusters according to a position of the at least one of the text clusters in the total ranking; and provide the selected at least one of the text clusters and a given number of highest ranked clusters to at least one downstream application, thereby limiting the number of processed clusters by the downstream application to the selected at least one of the text clusters, wherein each of the plurality of separate neural networks is individually pre-parametrized and individually trained neural networks.

* * * * *